US012565209B2

(12) United States Patent
Park et al.

(10) Patent No.:  US 12,565,209 B2
(45) Date of Patent:       Mar. 3, 2026

(54) VEHICLE CONTROL METHOD FOR ONE-PEDAL DRIVING ASSISTANCE

(71) Applicants: HYUNDAI MOTOR COMPANY, Seoul (KR); KIA CORPORATION, Seoul (KR)

(72) Inventors: Jin Rak Park, Hwaseong-si (KR); Jeong Soo Eo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 70 days.

(21) Appl. No.: 18/528,364

(22) Filed: Dec. 4, 2023

(65) Prior Publication Data

US 2025/0058777 A1     Feb. 20, 2025

(30) Foreign Application Priority Data

Aug. 14, 2023     (KR) ......................... 10-2023-0106086

(51) Int. Cl.
*B60W 30/165*          (2020.01)
*B60L 15/20*            (2006.01)
          (Continued)

(52) U.S. Cl.
CPC ........ *B60W 30/165* (2013.01); *B60W 60/001* (2020.02); *B60L 15/20* (2013.01);
          (Continued)

(58) Field of Classification Search
CPC ......... B60W 30/16; B60W 2554/4041; B60W 2754/50; B60W 2754/30;
          (Continued)

(56) References Cited

U.S. PATENT DOCUMENTS

2022/0089155 A1     3/2022  Shimizu et al.
2022/0105925 A1*    4/2022  Naserian ............. B60W 10/184
          (Continued)

FOREIGN PATENT DOCUMENTS

JP          2017056765 A      3/2017
JP          2020117009 A      8/2020
          (Continued)

*Primary Examiner* — Jay Khandpur
(74) *Attorney, Agent, or Firm* — Lempia Summerfield Katz LLC

(57)          ABSTRACT
A vehicle control method for one-pedal driving assistance including a process capable of accurately determining whether a traveling road is in a congested section in a proximity distance control start condition in a vehicle that enables one-pedal driving is provided. The vehicle control method includes including collecting, by a controller in a host vehicle having a one-pedal driving system, information on peripheral vehicles positioned, on a traveling road, in front of and behind the host vehicle and connected by a connected car system and information on a preceding vehicle positioned in front of each of the peripheral vehicles. The vehicle control method also includes determining, by the controller, whether the host vehicle is positioned in a congested section based on the information on the peripheral vehicles and the information on the preceding vehicle with respect to each of the peripheral vehicles.

19 Claims, 10 Drawing Sheets

(51) Int. Cl.
B60W 30/16 (2020.01)
B60W 60/00 (2020.01)

(52) U.S. Cl.
CPC ..... *B60L 2240/12* (2013.01); *B60L 2240/423* (2013.01); *B60L 2250/26* (2013.01); *B60W 30/16* (2013.01); *B60W 2510/083* (2013.01); *B60W 2540/10* (2013.01); *B60W 2554/404* (2020.02); *B60W 2554/4041* (2020.02); *B60W 2554/802* (2020.02); *B60W 2556/45* (2020.02); *B60W 2710/083* (2013.01); *B60W 2720/10* (2013.01); *B60W 2754/30* (2020.02); *B60W 2754/50* (2020.02)

(58) Field of Classification Search
CPC ....... B60W 2510/083; B60W 2540/10; B60W 2720/10; B60W 30/165; B60W 60/001; B60W 2710/083; B60W 2556/45; B60W 2554/404; B60W 2554/802; B60L 15/20; B60L 2240/12; B60L 2240/423; B60L 2250/26

See application file for complete search history.

(56) References Cited

U.S. PATENT DOCUMENTS

| | | | |
|---|---|---|---|
| 2023/0068362 A1 | 3/2023 | Wakamiya | |
| 2024/0066998 A1* | 2/2024 | Hagaribommanahalli | ................. B60L 15/2009 |
| 2024/0288895 A1* | 8/2024 | Kim | ..................... B60K 26/021 |

FOREIGN PATENT DOCUMENTS

| | | | |
|---|---|---|---|
| JP | 2023035189 A | 3/2023 |
| KR | 102191032 B1 | 12/2020 |
| WO | 2022013351 A1 | 1/2022 |

* cited by examiner

SATELLITE

GPS VEHICLE POSITION, RELATIVE DISTANCE
FROM PRECEDING VEHICLE, VEHICLE VELOCITY,
VEHICLE ACCELERATION INFORMATION

SERVER

GPS VEHICLE POSITION, RELATIVE DISTANCE
FROM PRECEDING VEHICLE, VEHICLE VELOCITY,
VEHICLE ACCELERATION INFORMATION

———— PRECEDING VEHICLE VELOCITY
— — — — DECREASED PRECEDING VEHICLE VELOCITY
------ FOLLOWING VEHICLE VELOCITY

VEHICLE CONTROL METHOD FOR ONE-PEDAL DRIVING ASSISTANCE

CROSS-REFERENCE TO RELATED APPLICATION

This application claims, under 35 U.S.C. § 119 (a), the benefit of and priority to Korean Patent Application No. 10-2023-0106086, filed on Aug. 14, 2023, the entire contents of which are incorporated herein by reference.

FIELD

The present disclosure relates to a vehicle control method for one-pedal driving assistance, and more particularly, to a vehicle control method capable of accurately determining whether a congested section of a traveling road exists in a proximity distance control start condition of an automatic distance control mode in a vehicle that enables one-pedal driving.

BACKGROUND

Technologies for improving convenience of vehicles may be classified into a technology for ensuring autonomous driving and a technology for improving convenience during general driving. For example, recently, cutting-edge driver assistance system technologies for autonomous driving, such as smart cruise control systems, have been applied to vehicles. In addition, technologies, such as one-pedal driving systems, for improving convenience during general driving have been applied to vehicles.

Therefore, the vehicle needs to provide convenience for both automatic driving and manual driving to a driver. Recently, the automatic driving technology and the manual driving technology have been classified and developed as different types of technologies.

Convenience improvement technologies that enable both the automatic driving and the manual driving in a special situation during the manual driving have been recently developed. As an example, there has been developed a system for automatically controlling a proximity distance from a front vehicle during one-pedal driving in a congested section.

The system for automatically controlling the proximity distance from the front vehicle during the one-pedal driving in the congested section is a system that may reduce ankle strain when a driver intends to adjust the proximity distance from the front vehicle to a desired distance in the congested section. The system is designed to maximally suppress a situation in which a pedal is repeatedly turned on and off or the pedal needs to be finely adjusted.

In order to control a distance between the vehicles, particularly, to perform proximity distance control in a congested section, it is necessary to previously determine whether an ego vehicle is in a congested section of a road before the control is started. In this case, if it cannot be accurately determined whether the ego vehicle is in the congested section, the driver needs to more repeatedly turn on and off the pedal during the proximity distance control, which may rather increase ankle strain.

Whether the ego vehicle is in the congested section may be determined based on a velocity of the front vehicle and a relative distance between the front vehicle and the ego vehicle. As a specific example, when the front vehicle is stopped and the relative distance from the front vehicle is within 5 to 10 meters (m), it may be determined that the front vehicle and the ego vehicle are in the congested section.

However, if the congested section is repeatedly determined by using this method, when the front vehicle travels slowly at low velocity, the driver needs to repeatedly turn on and off an accelerator pedal until the front vehicle is stopped and the relative distance becomes within a particular range.

In addition, when a velocity of the front vehicle is equal to or higher than a particular value, the driver needs to directly press the accelerator pedal again to keep up with the front vehicle after the proximity distance control is ended. Further, the driver needs to directly maintain the distance between the vehicles to a desired proximity distance until a congested section condition is satisfied again. In this case, because the pedal is frequently and repeatedly turned on and off, the driver inevitably feels discomfort, which eventually degrades usefulness of the proximity distance control system.

The above information disclosed in this Background section is provided only to enhance understanding of the background of the disclosure. Therefore, the Background section may contain information that does not form the prior art that is already known to a person of ordinary skill in the art.

SUMMARY OF THE DISCLOSURE

The present disclosure has been made in an effort to solve the above-mentioned problems. An object of the present disclosure is to provide a method capable of accurately determining whether an ego vehicle exists in a congested section in a system for automatically controlling a distance from a front vehicle during one-pedal driving in the congested section, thereby improving usefulness of a proximity distance control system.

The object of the present disclosure is not limited to the above-mentioned object. Other objects, which are not mentioned above, should be understood from the following descriptions by those having ordinary skill in the art to which the present disclosure pertains.

In an embodiment of the present disclosure, a vehicle control method for one-pedal driving assistance is provided. The vehicle control method includes collecting, by a controller in a host vehicle having a one-pedal driving system, information on peripheral vehicles positioned, on a traveling road, in front of and behind the host vehicle and connected by a connected car system and information on a preceding vehicle positioned in front of each of the peripheral vehicles. The vehicle control method also includes determining, by the controller, whether the host vehicle is positioned in a congested section based on the information on the peripheral vehicles and the information on the preceding vehicle with respect to each of the peripheral vehicles. The vehicle control method further includes controlling, by the controller, a relative velocity relative to the preceding vehicle by controlling an operation of a drive device configured to drive the vehicle so that a proximity distance control mode starts when a condition in which the host vehicle is positioned in the congested section is satisfied, and a relative distance between the host vehicle and the preceding vehicle is controlled to a preset target relative distance based on real-time driving information of the host vehicle and the information on the preceding vehicle.

Therefore, according to a vehicle control method for one-pedal driving assistance according to embodiments of the present disclosure, it is possible to accurately determine whether the traveling road is in the congested section in the proximity distance control start condition in the vehicle that enables the one-pedal driving.

Other aspects and embodiments of the disclosure are discussed below.

It should be understood that the term "vehicle", "vehicular", and other similar terms as used herein is inclusive of motor vehicles in general. Such motor vehicles may encompass passenger automobiles including sports utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
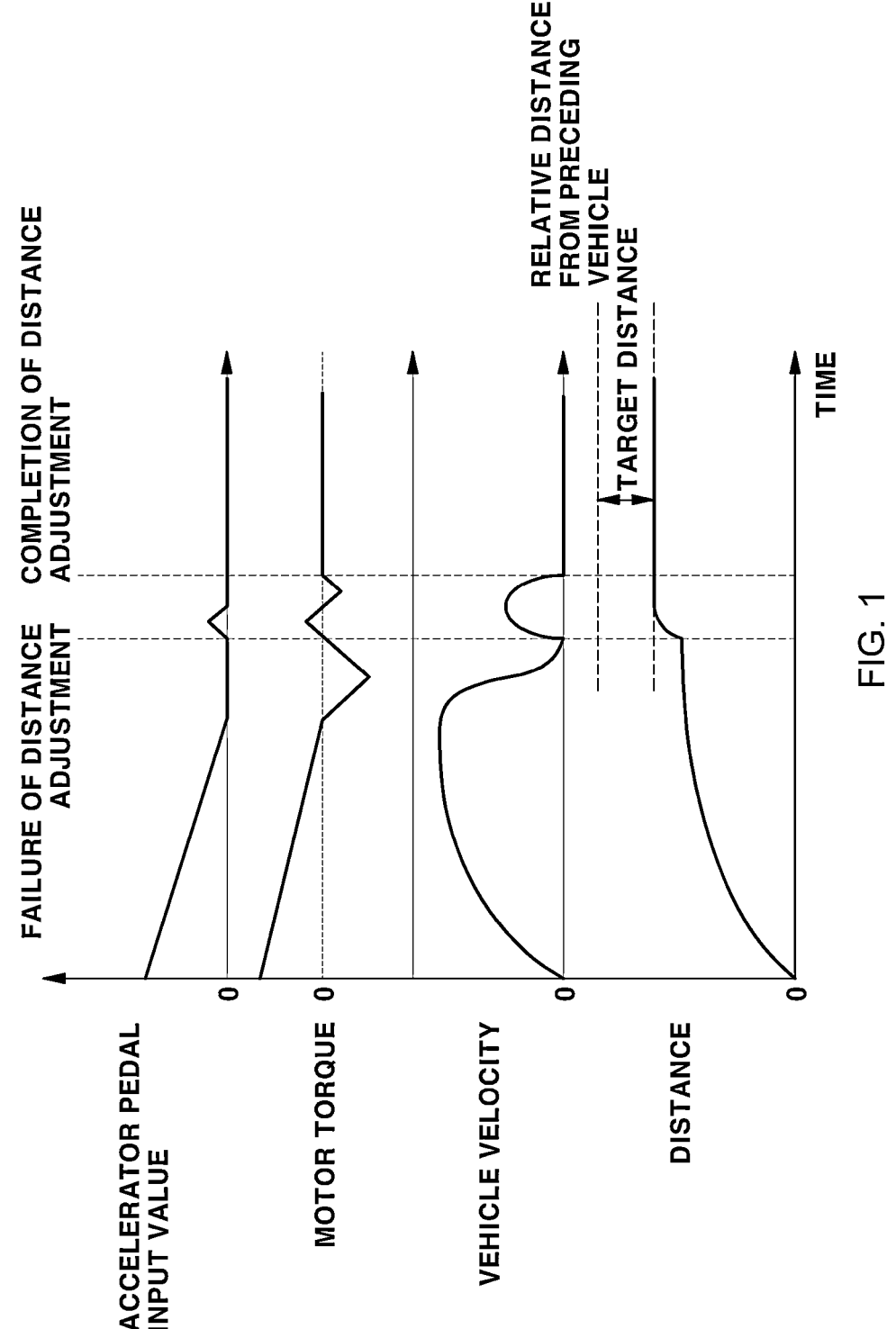
FIG. 1 and FIG. 2 are views for explaining problems in the related art.

It should be understood that the appended drawings are not necessarily to scale, presenting a somewhat simplified representation of various features illustrative of the basic principles of the disclosure. The specific design features of embodiments of the present disclosure, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference is made in detail to various embodiments of the present disclosure, examples of which are illustrated in the accompanying drawings and described below. While the features of present disclosure are described in conjunction with example embodiments, it should be understood that the present description is not intended to limit the disclosure to those example embodiments. On the contrary, the present disclosure is intended to cover not only the example embodiments, but also various alternatives, modifications, equivalents and other embodiments, which may be included within the spirit and scope of the disclosure as defined by the appended claims.

Hereinafter, embodiments of the present disclosure are described in detail with reference to the accompanying drawings. Specific structural and functional descriptions made in connection with embodiments of the present disclosure are provided only for the purpose of explaining embodiments according to the concept of the present disclosure. The embodiments according to the concept of the present disclosure may be carried out in various forms. The present disclosure should not be interpreted as being limited to the embodiments disclosed in the present specification. It should be understood that the present disclosure includes all modifications, equivalents, and alternatives included in the spirit and the technical scope of the present disclosure.

In the resent disclosure, terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, a first constituent element may be referred to as a second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, e.g., "between" and "just between" or "adjacent to" and "directly adjacent to", for explaining a relationship between constituent elements, should be interpreted in a similar manner.

Like reference numerals indicate like constituent elements throughout the specification. The terms used in the present specification are used merely to describe embodiments, and are not intended to limit the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements. When a component, device, element, or the like of the present disclosure is described as having a purpose or performing an operation, function, or the like, the component, device, or element should be considered herein as being "configured to" meet that purpose or perform that operation or function.

The present disclosure provides a method of determining whether a front vehicle exists in a congested section by using a vehicle connection technology and improves usefulness of an automatic proximity distance control system by means of the method.

As described above, it is important for the proximity distance control system, that automatically controls a proximity distance from the front vehicle during one-pedal driving in a congested section, to determine whether the front vehicle and an ego vehicle are in a congested section.

An object of the present disclosure is to determine whether the ego vehicle and peripheral vehicles are in a congested section by using information on connected vehicles, i.e., the peripheral vehicles communicably connected to each other, and to determine whether to operate proximity distance control based on the determination.

Embodiments of the present disclosure determine whether the ego vehicle is in a congested section by using information on an absolute position of the other vehicle communicably connected to the ego vehicle, a velocity of the other vehicle, an acceleration of the other vehicle, a relative distance between the other connected vehicle and a front vehicle immediately in front of the other connected vehicle, a velocity of the front vehicle positioned immediately in front of the other connected vehicle, and an acceleration of the front vehicle positioned immediately in front of the other connected vehicle.

In the following description, the ego vehicle is sometimes referred to as a 'host vehicle' or a 'control target vehicle'. In addition, the other vehicles including a front vehicle and a rear vehicle and excluding the ego vehicle are sometimes referred to as 'the other vehicles' or 'peripheral vehicles'. The front vehicle is sometimes referred to as a 'preceding vehicle', and the rear vehicle is sometimes referred to as a 'following vehicle'.

Further, in the following description, the term 'vehicle' that not categorized as the preceding vehicle, the following vehicle, and the other vehicle, generally refers to the ego vehicle, i.e., the host vehicle or the control target vehicle to which the present disclosure is applied.

Prior to describing embodiments of the present disclosure, for ease of understanding, problems with one-pedal driving and traveling in the related art are described with reference to FIG. 1 and FIG. 2.

FIG. 1 illustrates a result of driving a vehicle before a driver adapts to one-pedal driving. As illustrated in FIG. 1, in order to maintain a relative distance from the preceding vehicle to a desired target distance (target relative distance) in a congested section of a road in heavy traffic, the driver estimates that the vehicle travels some distance by inertia even though the driver turns off an accelerator pedal, and then the driver turns off the accelerator pedal before the current distance reaches the target relative distance.

However, in general, when the driver turns off the accelerator pedal during the one-pedal driving, the vehicle enters a regenerative braking mode, and negative (−) motor torque is applied to the vehicle. When a motor generates negative (−) torque as described above, the vehicle rapidly decelerates, such that the vehicle stops after traveling much less distance than the driver predicted.

Therefore, the driver needs to press the accelerator pedal again to meet the target distance. In this case, the driver needs to adjust the relative distance from the preceding vehicle again by finely manipulating the accelerator pedal. For reference, in general, the motor torque is determined based on a map set to be proportional to an accelerator pedal input value (APS value).

The driver needs to repeatedly turn on and off the accelerator pedal to adjust the distance from the preceding vehicle during the one-pedal driving in the congested section, which causes much discomfort and eventually degrades the utilization of one-pedal driving.

In the following description, an accelerator pedal off state is a state in which no accelerator pedal input is made by the driver, i.e., a state in which the driver does not manipulate the accelerator pedal or a state in which the driver does not press the accelerator pedal. A state in which the driver completely takes his/her foot off the accelerator pedal is also the accelerator pedal off state. In contrast, an accelerator pedal on state is a state in which the accelerator pedal input is made by the driver, i.e., a state in which the driver manipulates the accelerator pedal or a state in which the driver presses the accelerator pedal.

Figure 2:
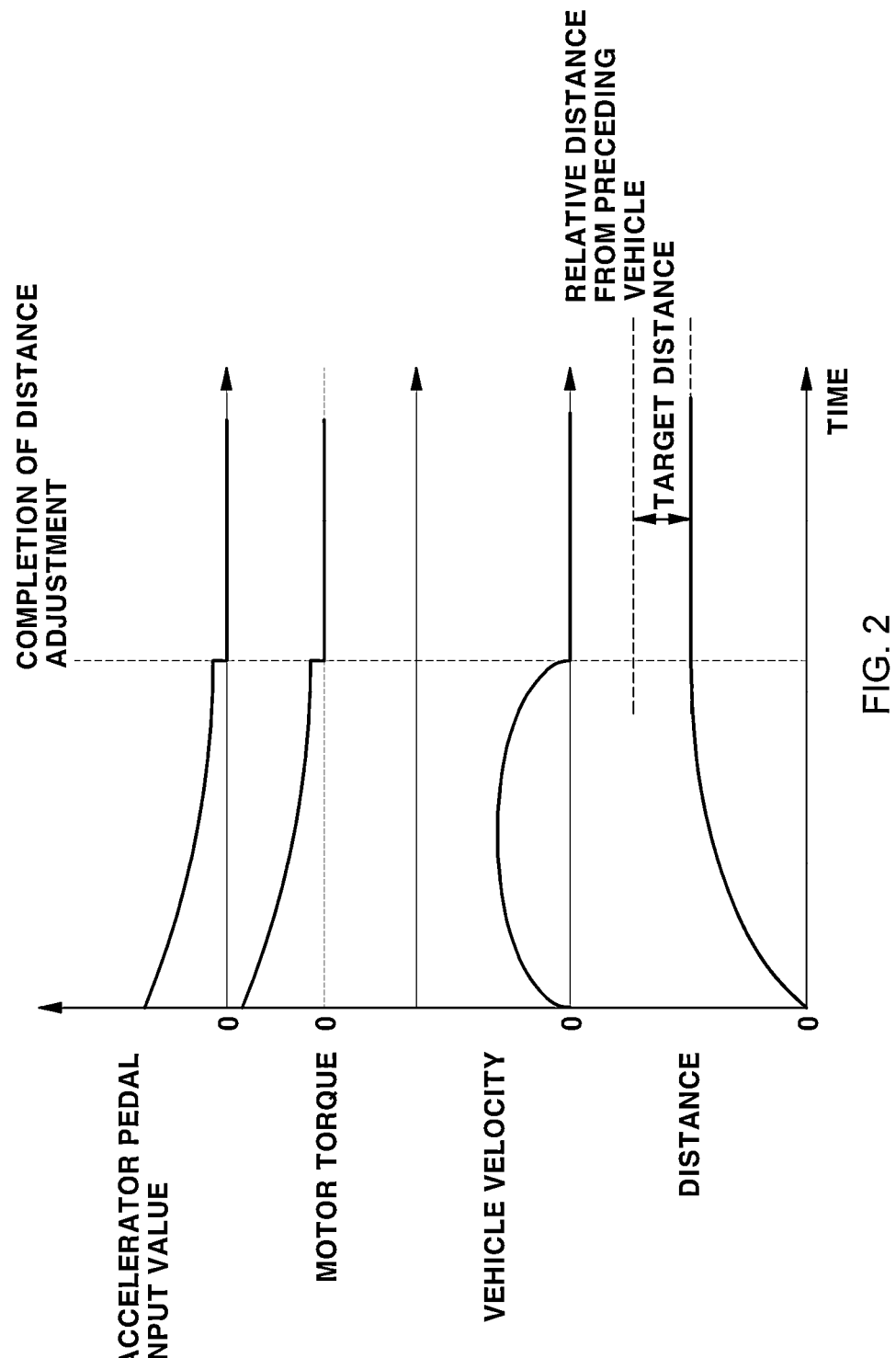

FIG. 2 illustrates a result of driving the vehicle after the driver adapts to the one-pedal driving. Even for experienced drivers, it is difficult to achieve the one-pedal driving and the result of driving the vehicle illustrated in FIG. 2.

In general, the general driver is inconvenienced because the driver needs to repeatedly turn on and off the accelerator pedal to maintain the relative distance from the preceding vehicle to the desired target distance (target relative distance) in the congested section. Therefore, when the driver recognizes the inconvenience and adapts to the one-pedal driving to some extent, the driver begins to finely adjust the accelerator pedal when the vehicle approaches the target distance.

For reference, even when the motor generates positive (+) torque, a vehicle velocity may gradually decrease because of road surface resistance torque. In this case, when the vehicle is very close to the target distance, the driver needs to finely adjust the distance by driving the vehicle at an extremely low velocity.

In this case, because it is necessary to finely adjust the accelerator pedal with a very small pedal effort to finely adjust the distance, the driver's ankle may be strained at the time of adjusting the distance, and it is not easy to actually adjust the distance.

As a result, the driver's ankle is greatly strained because the driver needs to repeatedly turn on and off the accelerator pedal or finely adjust the accelerator pedal in order to adjust the relative distance from the preceding vehicle during the one-pedal driving in the congested section in the related art.

Figure 3:
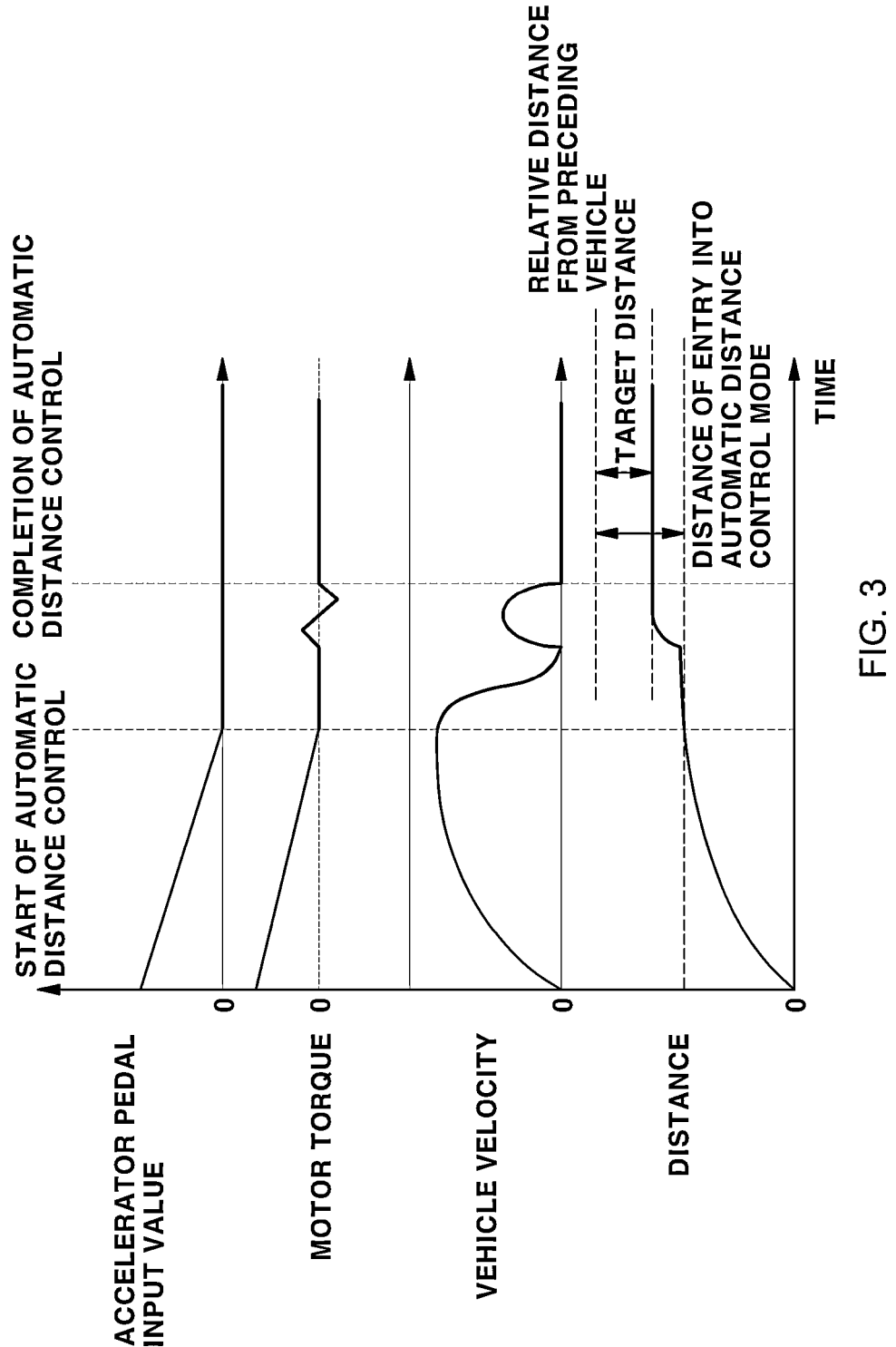
FIG. 3 and FIG. 4 are views illustrating an example vehicle control state for one-pedal driving assistance according to an embodiment of the present disclosure and illustrating an accelerator pedal off mode.
Figure 4:
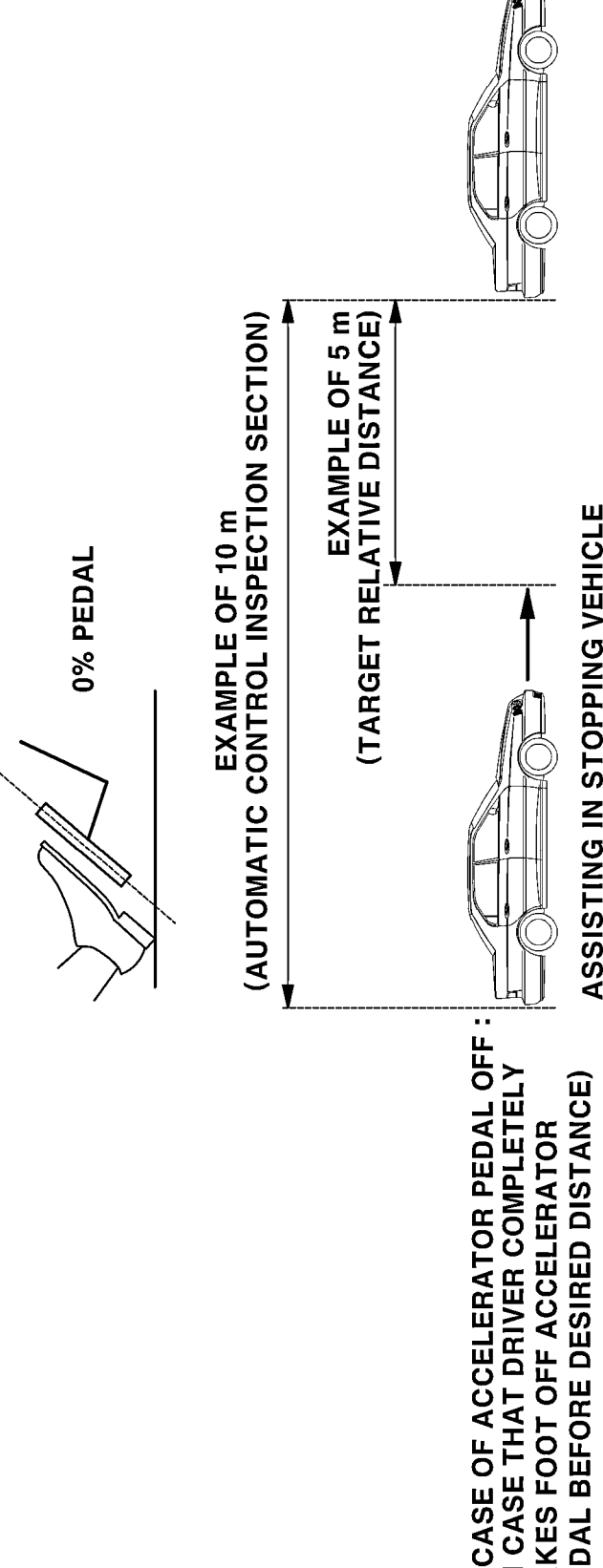

FIG. 3 and FIG. 4 are views illustrating an example vehicle control state for one-pedal driving assistance, according to an embodiment of the present disclosure. FIG. 3 and FIG. 4 illustrate an accelerator pedal off mode. In the accelerator pedal off mode, the accelerator pedal input value (APS value, %) is 0%.

In the following description, the relative distance means a distance between the vehicles, e.g., a relative distance between the host vehicle (control target vehicle) and the preceding vehicle, a relative distance between the host vehicle and the following vehicle, a relative distance between the other vehicle and the preceding vehicle, and the like.

Likewise, the relative velocity may be a velocity difference between the vehicles, e.g., a velocity difference between the host vehicle and the preceding vehicle. In this case, the control of the relative velocity from the preceding vehicle may be performed by controlling the motor torque of the host vehicle.

A controller, of the vehicle, that performs the control for the one-pedal driving assistance, determines whether the vehicle enters an automatic inspection control section by using relative distance information of preceding vehicle information detected by a front detection part. For example, the controller may determine that the vehicle enters the automatic inspection control section when the vehicle reaches a maximum relative distance set by the driver.

In an embodiment, an automatic distance control mode (automatic proximity distance control mode in the congested section in the present disclosure) is started by the controller when the traveling road is in the congested section at a time point at which the vehicle enters the automatic inspection control section. The automatic distance control mode (the proximity distance control mode in the congested section) includes an accelerator pedal off mode, which is a control mode in the accelerator pedal off state, and an accelerator pedal on mode, which is a control mode in the accelerator pedal on state.

The controller enters the accelerator pedal off mode of the automatic distance control mode when the controller determines that the accelerator pedal is in the off state based on the accelerator pedal input value (APS value) at the time point at which the vehicle enters the automatic inspection control section.

In contrast, the controller enters the accelerator pedal on mode of the automatic distance control mode when the controller determines that the accelerator pedal is in the on state based on the accelerator pedal input value (APS value) at the time point at which the vehicle enters the automatic inspection control section.

The accelerator pedal off mode is a mode that controls the vehicle velocity to stop the vehicle at the desired distance (the target relative distance from the preceding vehicle) even when the driver completely turns off the accelerator pedal within an automatic distance control mode entry distance before the vehicle reaches the target distance (target relative distance) from the preceding vehicle intended to be maintained.

In this process, the control may be performed to completely stop the vehicle in the accelerator pedal off state and then move the vehicle forward so that the relative distance (actual distance) from the preceding vehicle becomes the target relative distance. Alternatively, as illustrated in FIG. 4, the control may be performed to slowly decrease the vehicle velocity without stopping the vehicle so that the relative distance from the preceding vehicle becomes the target relative distance.

In the accelerator pedal off mode, even when the accelerator pedal is completely turned off, i.e., the driver does not press the accelerator pedal at a position before the vehicle reaches a position corresponding to a particular distance from the preceding vehicle intended to be maintained by the driver, the vehicle velocity is automatically controlled (the relative velocity is controlled), and the positive (+) motor torque is generated, thereby stopping the vehicle at the target relative distance from the preceding vehicle.

Figure 5:
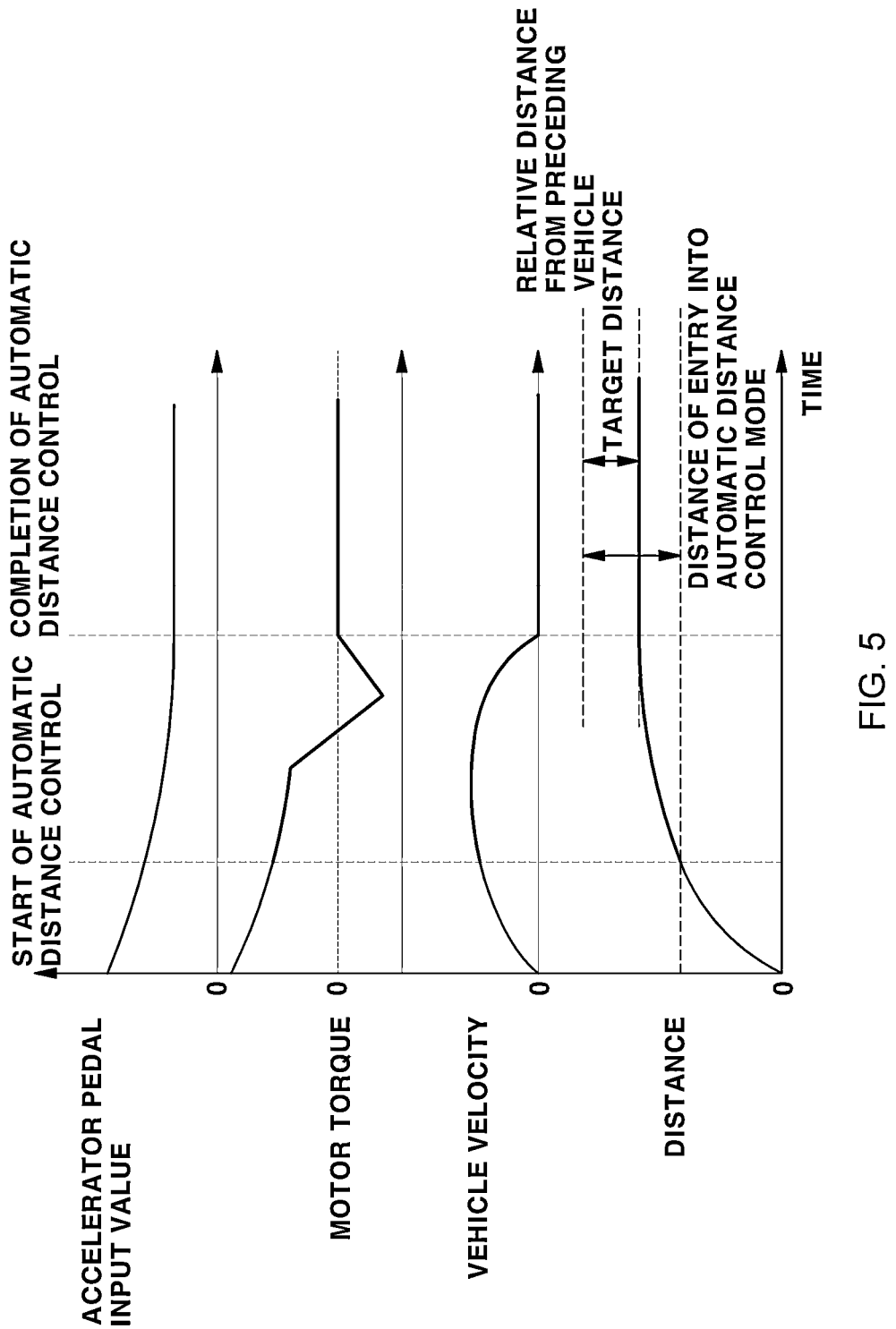
FIG. 5 and FIG. 6 are views illustrating the example vehicle control state for the one-pedal driving assistance according to an embodiment of the present disclosure and illustrating an accelerator pedal on mode.
Figure 6:
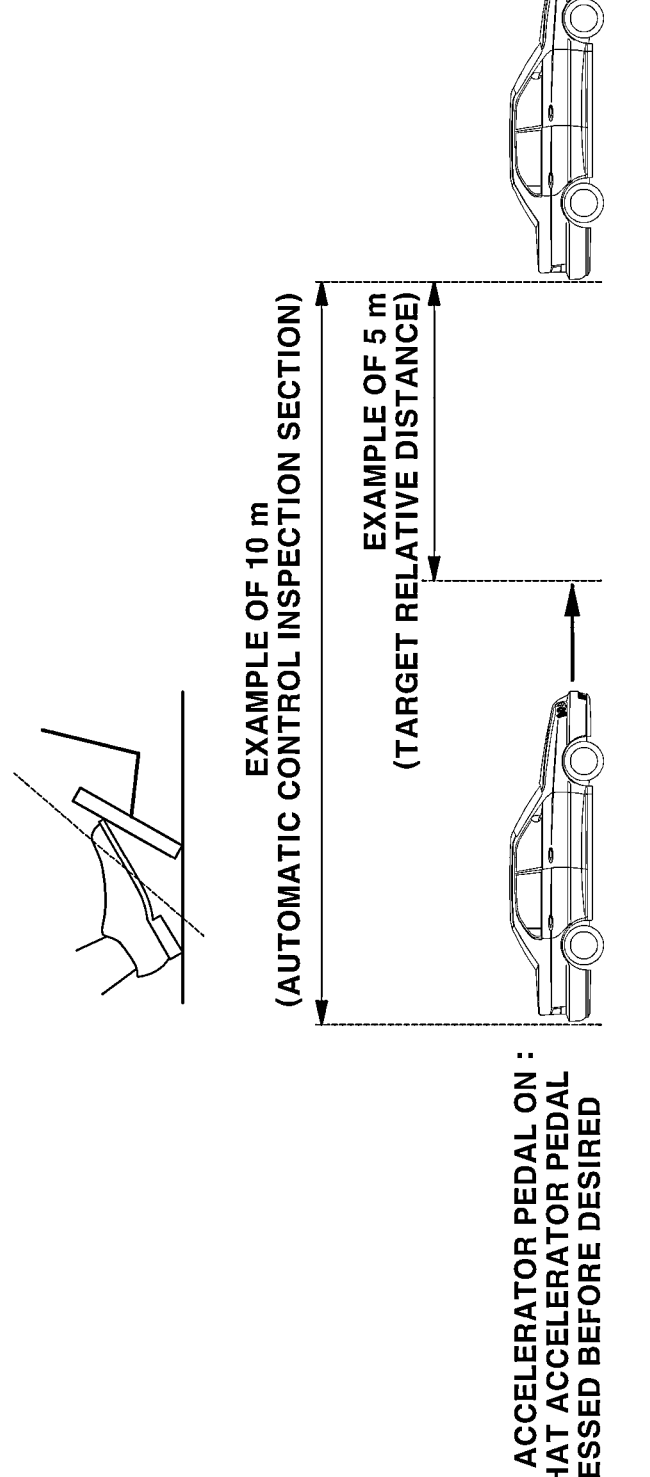

FIG. 5 and FIG. 6 are views illustrating a vehicle control state for the one-pedal driving assistance, according to an embodiment of the present disclosure. FIG. 5 and FIG. 6 illustrate the accelerator pedal on mode.

The accelerator pedal on mode is a mode in which even when the driver presses the accelerator pedal in the on state within the automatic distance control mode entry distance before the vehicle reaches the target distance (target relative distance) from the preceding vehicle intended to be maintained, the controller controls the vehicle velocity by generating and outputting a deceleration torque command (motor torque<0) as a motor torque command. In this case, the controller decelerates the vehicle to stop the vehicle at the desired distance (the target relative distance from the preceding vehicle).

When the controller determines that the vehicle velocity is too low to stop the vehicle at the desired distance in the accelerator pedal on state, the controller may control the vehicle velocity by generating and outputting an acceleration torque command (motor torque>0). In this case, the controller accelerates the vehicle and enables the vehicle to stop at the desired distance (the target relative distance).

In this process, when the vehicle accelerates in an intact manner when the driver turns on the accelerator pedal before the vehicle reaches the target distance (target relative distance) from the preceding vehicle intended to be maintained, the vehicle may pass over a position corresponding to the target relative distance. Therefore, the controller controls the vehicle velocity by generating and outputting a negative (−) torque command, i.e., a deceleration torque command, and generates motor torque in order to decelerate the vehicle and accurately stop the vehicle at the target relative distance from the preceding vehicle.

When the driver inputs a target relative distance $s_{target}$, that is intended to be maintained from the preceding vehicle, through an input device of the vehicle in the vehicle control method for one-pedal driving assistance, the target relative distance inputted by the driver may be transmitted to and stored and set in the controller.

In addition, the driver may set an automatic control inspection section for the proximity distance control during the one-pedal driving, and this process may be performed as the driver inputs a maximum relative distance (Δcon) for the automatic control inspection section through the input device. In this case, the inputted maximum relative distance defines the automatic control inspection section in which the automatic distance control is performed.

The maximum relative distance may be defined as a distance (maximum relative distance) between the preceding vehicle and a rear position farthest from the preceding vehicle in the section (automatic control inspection section) in which the automatic distance control mode is performed. In this case, the farthest position is a start position of the automatic control inspection section, i.e., a position at which the automatic distance control mode starts.

In addition, a distance between the preceding vehicle and the start position of the automatic control inspection section (the position at which the automatic distance control mode starts) is a control start relative distance (a maximum relative distance in the automatic control inspection section).

As described above, the section from the position of the preceding vehicle to the maximum relative distance is the automatic control inspection section. In the state in which the driver previously inputs and sets the maximum relative distance through the input device, the controller determines the section that is within the maximum relative distance from the preceding vehicle as the automatic control inspection section.

Therefore, when the vehicle reaches the position (automatic control inspection section start position) spaced apart from the preceding vehicle at the preset maximum relative distance, the controller of the vehicle enters the automatic distance control mode, and the controller determines the section from this position to the position of the preceding vehicle as the automatic control inspection section.

When the vehicle reaches the position spaced apart from the preceding vehicle at the preset maximum relative distance, i.e., when the vehicle enters the automatic control inspection section, the controller starts the accelerator pedal on mode of the automatic distance control mode in the accelerator pedal on state in which the accelerator pedal input value is larger than 0.

In addition, when the vehicle reaches the position spaced apart from the preceding vehicle at the preset maximum relative distance, i.e., when the vehicle enters the automatic control inspection section, the controller starts the accelerator pedal off mode of the automatic distance control mode in the accelerator pedal off state in which the accelerator pedal input value is 0.

At the time of determining whether the vehicle enters the automatic control inspection section by using the preset maximum relative distance as described above, the maximum relative distance may be set to different values depending on the accelerator pedal on mode and the accelerator pedal off mode.

As described above, the proximity distance control in the congested section during the one-pedal driving may be performed separately in the accelerator pedal on mode and the accelerator pedal off mode depending on the circumstances. In each of the modes, the control is performed in the order of a relative velocity control start condition, target relative velocity generation, and relative velocity control.

The reason that the term "relative velocity control" is mentioned in the proximity distance control is that the relative velocities are sequentially expressed as functions of the relative distances in order to control the relative distance, and then the relative velocity is controlled. Accordingly, the reason is that the relative velocity is controlled to control the relative distance.

As described above, the vehicle enters the automatic control inspection section when the relative distance of the vehicle from the preceding vehicle reaches the preset maximum relative distance, and the accelerator pedal on mode and the accelerator pedal off mode are determined by determining whether the accelerator pedal is turned on or off in the state in which the vehicle enters the automatic control inspection section. Separately, the automatic distance control mode, i.e., the proximity distance control mode in the congested section, is performed when the road on which the vehicle travels is in the congested section.

Hereinafter, embodiments of the present disclosure are described in more detail with reference to the drawings.

The present disclosure relates to a vehicle control method for one-pedal driving assistance and to a vehicle control method of automatically maintaining a distance from the preceding vehicle to a predetermined distance by using a front sensor while a motorized vehicle travels by one-pedal driving.

In addition, the present disclosure relates to a proximity distance control method of the vehicle that automatically controls a proximity distance from the preceding vehicle during the one-pedal driving in the congested section. Embodiments of the present disclosure provide a method capable of accurately determining whether the road on which the vehicle that performs the one-pedal driving assistance and the proximity distance control in the congested section currently travels is in the congested section.

Figure 7:
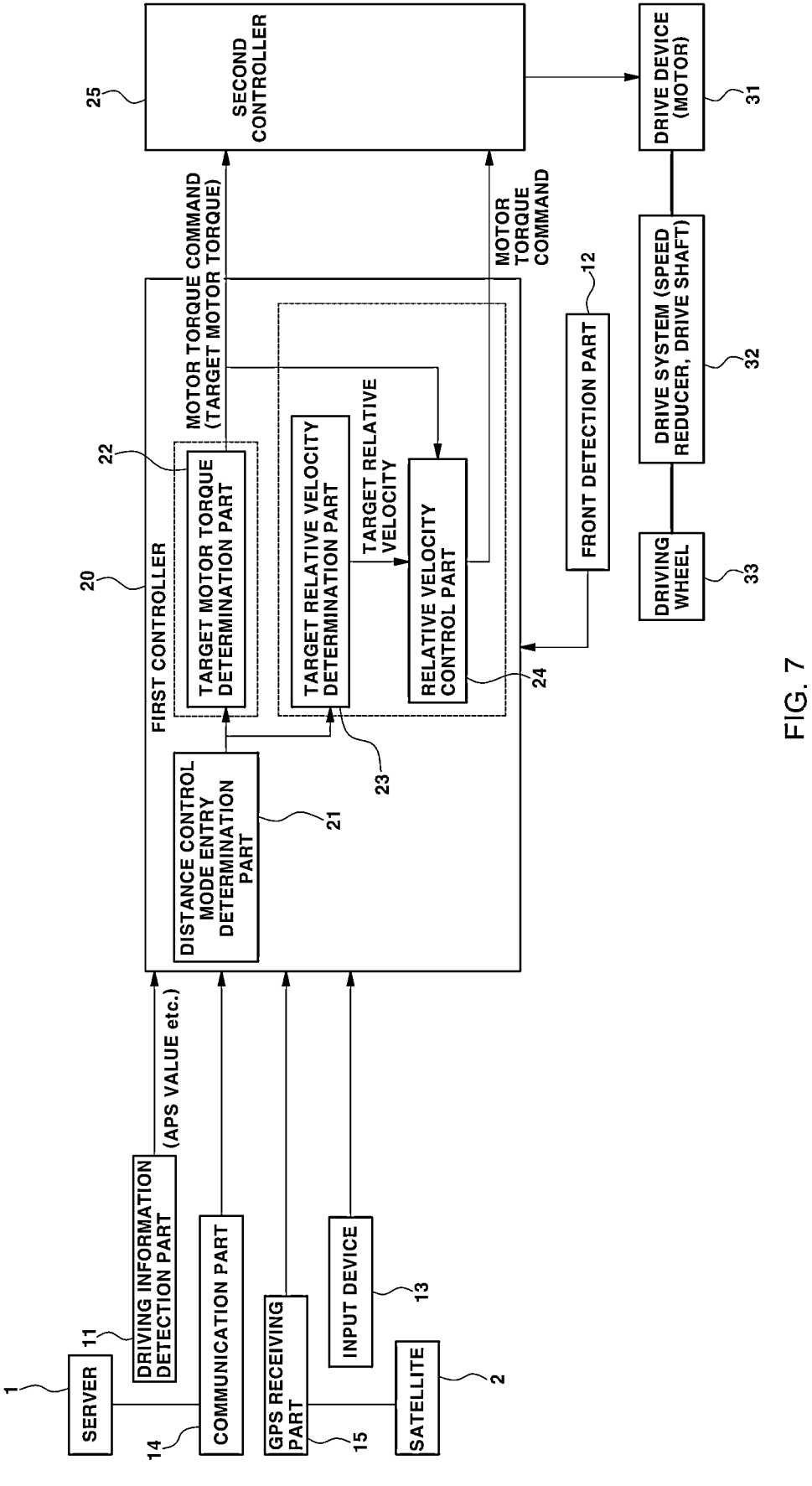
FIG. 7 is a configuration view illustrating an example vehicle control system that performs a congested section determination process, according to an embodiment of the present disclosure.

FIG. 7 is a configuration view illustrating an example vehicle control system that performs a congested section determination process, according to an embodiment of the present disclosure.

The system for performing the vehicle control according to an embodiment of the present disclosure includes a driving information detection part 11 configured to detect real-time vehicle driving information while the vehicle travels. The system also includes a first controller 20 configured to generate and output a motor torque command based on the vehicle driving information detected by the driving information detection part 11. The system further includes a second controller 25 configured to control an operation of a motor based on the motor torque command outputted by the first controller 20.

In the following description, the 'motor' means a motor, such as a drive device 31, configured to drive the vehicle, e.g., a drive motor connected to a driving wheel 33 of the vehicle so as to be able to transmit power.

The driving information detection part 11 is a configuration part configured to detect information indicating the vehicle driving state required to generate and determine the motor torque command in the vehicle, i.e., to detect the vehicle driving information. The vehicle driving information may include vehicle state information and driver driving input information.

In an embodiment of the present disclosure, the driving information detection part 11 may include an accelerator pedal detection part configured to detect the accelerator pedal input value (APS value, %) of the driver in accordance with the manipulation of the accelerator pedal by the driver, a wheel velocity detection part configured to detect a wheel velocity, and a steering angle detection part configured to detect a steering angle in accordance with the manipulation of a steering wheel by the driver.

The accelerator pedal detection part may be a typical sensor for acquiring accelerator pedal input information from the driver, i.e., a typical accelerator pedal sensor (accelerator position sensor (APS)) installed on the accelerator pedal and configured to output an electrical signal in accordance with the state of the manipulation of the accelerator pedal by the driver.

The wheel velocity detection part may be a typical wheel velocity sensor, and it is possible to obtain wheel velocity and vehicle velocity information from a signal of the wheel velocity sensor. Because the configuration in which the vehicle velocity information is obtained from the signal of the wheel velocity sensor is a technology well known in the technical field, a detailed description thereof has been omitted.

The driving information detection part 11 may further include a separate vehicle velocity detection part configured to detect the vehicle velocity instead of using the signal of the wheel velocity detection part (wheel velocity sensor) in order to acquire the vehicle velocity information.

The steering angle detection part may be a typical sensor configured to detect a steering angle, i.e., steering input information by the driver, e.g., a typical steering angle sensor (SAS) configured to output an electrical signal in accordance with the manipulation of the steering wheel by the driver.

The vehicle driving information may include an accelerator pedal input value (APS value) detected as a driving input value in accordance with the manipulation of the accelerator pedal by the driver and detected by the accelerator pedal detection part, a wheel velocity detected by the wheel velocity detection part, a vehicle velocity (a velocity of the control target vehicle) obtained by the wheel velocity detection part or detected by the vehicle velocity detection part, and a steering angle detected as a driving input value in accordance with the manipulation of the steering wheel by the driver and detected by the steering angle detection part. In an embodiment, the accelerator pedal input value and the steering angle are the driver driving input information, and the wheel velocity and the vehicle velocity are the vehicle state information.

In an embodiment, the first controller 20 generates and outputs a command for generating target motor torque, i.e., a motor torque command for an entry state of the automatic distance control mode and a non-entry state of the automatic distance control mode. The automatic distance control mode may be referred to as a mode in which the control of the proximity distance from the preceding vehicle is performed during the one-pedal driving of the control target vehicle in the congested section, i.e., the proximity distance control mode.

The first controller 20 may be a vehicle control unit (VCU) or a hybrid control unit (HCU) that generates a motor torque command based on the vehicle driving information in the typical motorized vehicle.

The first controller 20 may include a target motor torque determination part 22 configured to determine the target motor torque during the one-pedal driving and generate the motor torque command for generating the determined target motor torque in an ordinary state (i.e., the non-entry state of the automatic distance control mode) in which the vehicle does not enter the automatic distance control mode.

The first controller 20 may further include a target relative velocity determination part 23 configured to determine the target relative velocity from the preceding vehicle by using the preceding vehicle information in the entry state of the automatic distance control mode. The first controller 20 may additionally include a relative velocity control part 24 configured to determine the target motor torque for controlling the relative velocity (the relative velocity from the preceding vehicle) in the automatic distance control mode by using the determined target relative velocity from the preceding vehicle and actual relative velocity information and generate the motor torque command for generating the determined target motor torque.

The target motor torque determination part 22 may determine the target motor torque that meets the driver request torque based on the accelerator pedal input value (APS value) acquired by the accelerator pedal detection part (APS) of the driving information detection part 11 during the one-pedal driving in the non-entry state of the automatic distance control mode. The target motor torque determination part 22 may generate the motor torque command for generating the determined target motor torque.

The target relative velocity determination part 23 may determine the target relative velocity relative to the preceding vehicle by using information on the relative distance from the preceding vehicle in the preceding vehicle information detected by a front detection part 12 during the one-pedal driving in the entry state of the automatic distance control mode.

The relative velocity control part 24 may determine the target motor torque for controlling the vehicle relative velocity (the relative velocity from the preceding vehicle) in the automatic distance control mode to the target relative velocity by using an actual relative velocity from the preceding vehicle in the preceding vehicle information detected by the front detection part 12 and the target relative velocity from the preceding vehicle determined and inputted by the target relative velocity determination part 23. The relative velocity control part 24 may generate the motor torque command for generating the determined target motor torque.

Therefore, the motor torque command in the non-entry state of the automatic distance control mode, which is outputted by the target motor torque determination part 22 of the first controller 20, and the motor torque command in the entry state of the automatic distance control mode, which is outputted by the relative velocity control part 24 of the first controller 20, are inputted to the second controller 25.

The second controller 25 controls the operation of the motor (e.g., the drive device 31) in response to the motor torque command inputted from the first controller 20. The second controller 25 may be a well-known motor control unit (MCU) configured to operate the motor by means of an inverter in the typical motorized vehicle and control the operation of the motor.

The second controller 25 controls the operation of the motor (e.g., the drive device 31) in response to the motor torque command in the non-entry state of the automatic distance control mode that is inputted by the first controller 20, or the motor torque command in the entry state of the automatic distance control mode.

In the present specification, the first controller 20 and the second controller 25 are separately described as control subjects. However, the vehicle control process according to embodiments of the present disclosure may also be performed by a single integrated control element instead of a plurality of controllers.

All the plurality of controllers and the single integrated control element may be collectively referred to as a controller, and the control process of according to embodiments of the present disclosure described below may be performed by the controller. In the following description, the 'controller' is commonly referred to as the first controller 20 and the second controller 25, as described above.

As a result, as illustrated in FIG. 7, torque and a rotational force that are outputted by the motor in the state in which the operation of the motor (e.g., is the drive device 31) is controlled may be transmitted to the driving wheel 33 through a drive system 32 such as a speed reducer and a drive shaft, such that the vehicle may travel and move.

Further, the system for performing the vehicle control according to embodiments of the present disclosure may further include the front detection part 12 which is a detection element installed in the vehicle separately from the driving information detection part 11 and serves to detect the preceding vehicle information.

In embodiments of the present disclosure, the front detection part 12 may be a radar (radio detection and ranging) sensor, a lidar (light detection and ranging) sensor, or an ultrasonic sensor that is a well-known front sensor for detecting the preceding vehicle information.

The preceding vehicle information that may be detected by the front detection part 12 includes the relative velocity and the relative distance from the preceding vehicle. In the present disclosure, the relative distance from the preceding vehicle means a distance between the host vehicle (control target vehicle) and the preceding vehicle.

In addition, in the present disclosure, the relative velocity $v_{rel}$ relative to the preceding vehicle means a relative velocity of the preceding vehicle relative to the host vehicle, and the relative velocity $v_{rel}$ is a difference ($v_{rel} = v_{front} - v_{veh}$) between a velocity $v_{veh}$ of the host vehicle and a velocity $v_{front}$ of the preceding vehicle.

The relative distance of the preceding vehicle information is used by the target relative velocity determination part 23, and the relative velocity of the preceding vehicle information is used by the relative velocity control part 24. Because the above-mentioned method of acquiring information on the preceding vehicle from the signal of the radar sensor or the lidar sensor is a well-known technology, a detailed description thereof has been omitted.

The system for performing the vehicle control according to the present disclosure may further include a communication part 14 and a GPS receiving part 15 mounted in the vehicle. The system may further include a vehicle external data server 1 and an artificial satellite 2. The artificial satellite 2 may be a global positioning system (GPS) satellite.

In an embodiment, the first controller 20 processes signals inputted through the communication part 14 and the GPS receiving part 15 and performs a process of determining whether the congested section exists, a process of determining the entry into the automatic distance control mode, and the like, based on information acquired in real time from the inputted signal.

To this end, the first controller 20 may further include a distance control mode entry determination part 21. The control mode entry determination part 21 may be configured to determine whether the current traveling road is in the congested section based on information acquired from the signals received through the communication part 14 and the GPS receiving part 15. control mode entry determination part 21 may be configured to determine the entry into the automatic distance control mode based on a result of the determination.

The GPS receiving part 15 is provided to receive a GPS signal that indicates the current position of the vehicle from the outside of the vehicle. In addition, the GPS receiving part 15 is provided to input the GPS signal, that is received as a signal related to the vehicle position, to the distance control mode entry determination part 21 of the first controller 20. In this case, the distance control mode entry determination part 21 of the first controller 20 may determine, in real time, the current vehicle position from the GPS signal received through the GPS receiving part 15.

In addition, the control target vehicle (host vehicle) may receive various types of information from the vehicle external data server 1 through the mounted communication part 14 and be communicably connected to the other vehicles at the periphery of the control target vehicle (host vehicle). The other vehicles may include the preceding vehicle and the following vehicle with respect to the control target vehicle (host vehicle).

The communication part 14 may be provided to communicate with the vehicle external device in a wired or wireless manner. The information received through the communication part 14 may be inputted to the distance control mode entry determination part 21 of the first controller 20.

The communication part 14 may include a communication device of an AVN (audio, video & navigation) system mounted in the vehicle and configured to communicate with the vehicle external device in a wireless manner through a mobile communication network and the like. In addition, the communication part 14 may be adopted without limitation as long as the communication part 14 is provided in the vehicle to perform wireless communication between the first controller 20 and the vehicle external device.

In the present disclosure, the control target vehicle (host vehicle) and the other vehicle (peripheral vehicle) may be referred to as connected cars that communicate and exchange information with smartphones, homes, offices, road network systems, transportation systems, and the like through the communication parts 14.

In addition, in embodiments of the present disclosure, the vehicles may be vehicles communicably connected to one another in order to implement a connected car computing system. The vehicles may perform communication between vehicles and communication between the vehicle the data server 1 through the communication parts 14. The vehicles may be vehicles capable of receiving necessary information from the artificial satellite 2 through the GPS receiving parts 15.

For example, according to embodiments of the present disclosure, the distance control mode entry determination part 21 of the first controller 20 mounted in the vehicle may receive information on the peripheral vehicle, that is connected to the vehicle to communicate with the vehicle, and information on the preceding vehicle with respect to the peripheral vehicle through the communication part 14.

The information on the peripheral vehicle may include an absolute position of the peripheral vehicle, a velocity of the peripheral vehicle, and an acceleration of the peripheral vehicle. The information on the preceding vehicle with respect to the peripheral vehicle may include a relative distance between the peripheral vehicle and the preceding vehicle that travels immediately in front of the peripheral vehicle, a velocity of the preceding vehicle with respect to the peripheral vehicle, and an acceleration of the preceding vehicle with respect to the peripheral vehicle.

Therefore, the distance control mode entry determination part 21 of the first controller 20 may recognize the current vehicle position from the GPS signal received through the GPS receiving part 15 and receive the information on the peripheral vehicle and the information on the preceding vehicle with respect to the peripheral vehicle that are received through the communication part 14.

An example configuration of the system for performing the vehicle control according to embodiments of the present disclosure has been described with reference to FIG. 7. With the illustrated system, the control target vehicle may perform the control of the relative velocity relative to the preceding vehicle, the control of the relative distance from the preceding vehicle, and the control of the motor by using the information detected by the front detection part 12 during the one-pedal driving. For example, the relative velocity relative to the preceding vehicle may be controlled based on the relative distance from the preceding vehicle in order to perform the automatic distance control between the host vehicle and the preceding vehicle.

In addition, the driver may set the target relative distance, that is intended to be maintained from the preceding vehicle, by means of an input device 13 provided in the vehicle in order to control the distance from the preceding vehicle. Furthermore, the driver may set and input a maximum relative distance through the input device 13, and the maximum relative distance may be used to determine the automatic control inspection section, which are described below, during the actual vehicle operation in which the automatic distance control is performed.

In addition, within the preset maximum relative distance from the preceding vehicle, the control modes may be differently set depending on whether the accelerator pedal is turned on or off in the automatic control inspection section. In this case, the information related to the state in which the accelerator pedal is turned on or off may be acquired by the controller (first controller) from the signal of the accelerator pedal detection part of the driving information detection part 11.

The timing for performing the control of the relative velocity from the preceding vehicle may be variously applied depending on the vehicle velocity and the steering angle, that are acquired by the driving information detection part 11, and the information on the relative distance and the relative velocity detected by the front detection part 12.

The target relative velocity that is to be controlled based on the relative distance to perform the automatic distance control may be determined by the controller, e.g., the target relative velocity determination part 23 of the first controller 20. The relative velocity control part 24 of the first controller 20 may determine the target motor torque for the relative velocity control by comparing the target relative velocity determined by the target relative velocity determination part 23 with the actual relative velocity detected through the front detection part 12.

As described above, according to embodiments of the present disclosure, the target motor torque may be determined by using the relative velocity. The first controller 20 may generate the motor torque command for generating the target motor torque, and may transmit the motor torque command to the second controller 25.

Therefore, the second controller 25 including the motor driver or the inverter converts the target motor torque that corresponds to the motor torque command received from the first controller 20 into a target motor current by using a relationship between the motor torque and a motor current. As a result, the motor torque is controlled as the motor current is controlled to the target motor current by the motor driver or the inverter.

The accelerator pedal on mode and the accelerator pedal off mode, according to embodiments, =described in detail below.

In the present disclosure, the reason that the term "relative velocity control" is mentioned to control the vehicle relative distance is that the target relative velocity is calculated with the function of the relative distance by high-level control, and then the relative velocity is controlled by low-level control. Accordingly, the reason is that the relative velocity is controlled to control the relative distance.

1. Accelerator Pedal on Mode

The controller (first controller) may be set to perform the vehicle relative velocity control only when the vehicle relative distance (the distance from the preceding vehicle) is equal to or shorter than the predetermined control start relative distance in the accelerator pedal on mode.

This may be summarized as follows.

When $s > s_{on.start}$, the relative velocity control is not performed.

When $s \leq s_{on.start}$, the relative velocity control is performed.

Here, s represents the vehicle relative distance, and $s_{on.start}$ represents the control start relative distance.

The control start relative distance $s_{on.start}$ may be defined as the distance of the automatic control inspection section, i.e., the preset maximum relative distance ($\Delta$con) by the driver ($s_{on.start} = \Delta$con). Alternatively, as described below, the control start relative distance $s_{on.start}$ may be obtained from information such as the vehicle velocity of the control target vehicle (host vehicle) in the accelerator pedal on mode, the amount of maximum deceleration torque limitation of the motor, and the road surface resistance torque.

The reason that the control start relative distance varies depending on the vehicle velocity, the amount of maximum deceleration torque limitation of the motor, the road surface resistance torque, and the like, is that there is a distance (hereinafter, referred to as a 'minimum traveling distance') that the vehicle kinematically travels when the vehicle is decelerated by the maximum motor torque with respect to a particular vehicle velocity and road surface resistance torque. Further, the reason is that the vehicle needs to be decelerated from a position farther than a minimum traveling distance with respect to a particular vehicle velocity so that the vehicle is stopped at the target relative distance.

In addition, the controller (first controller) may be set to perform the vehicle relative velocity control only when the vehicle velocity in the accelerator pedal on mode, i.e., the velocity of the control target vehicle (host vehicle) is equal to or lower than a predetermined control start relative velocity.

This may be summarized as follows.

When $v_{veh} > v_{veh.threshold}$, the relative velocity control is not performed.

When $v_{veh} \leq v_{veh.threshold}$, the relative velocity control is performed.

Here, $v_{veh}$ represents the vehicle velocity, and $v_{veh.threshold}$ represents the control start relative velocity.

Further, the controller (first controller) may be set to perform the vehicle relative velocity control only when the following predetermined condition is satisfied based on vehicle driving information and relative velocity information such as the wheel velocity and the vehicle velocity (the velocity of the host vehicle) in the accelerator pedal on mode.

When $|r_w\omega_w + v_{rel}| > v_{diff.threshold}$, the relative velocity control is not performed.

When $|r_w\omega_w + v_{rel}| \leq v_{diff.threshold}$, the relative velocity control is performed.

$$v_{rel} = v_{front} - v_{veh}, \ v_{veh} = r_w\omega_w$$

Here, $v_{front}$, $v_{veh}$, $r_w$, $\omega_w$, $v_{rel}$, and $v_{diff.threshold}$ respectively represent, respectively, a velocity of the preceding vehicle, a velocity of the host vehicle (control target vehicle), a wheel radius of the host vehicle, a wheel velocity of the host vehicle, a relative velocity, and a preset limit value.

The above-mentioned predetermined condition may be set to a condition in which a sum of the velocity $v_{veh}$ of the host vehicle and the relative velocity $v_{rel}$ is equal to or lower than the limit value $v_{diff.threshold}$.

In addition, the controller (first controller) may be set to perform the vehicle relative velocity control only when the steering angle in the accelerator pedal on mode is equal to or smaller than a predetermined steering angle limit value.

This may be summarized as follows.

When $\theta_{steer} > \theta_{steer.threshold}$, the relative velocity control is not performed.

When $\theta_{steer} \leq \theta_{steer.threshold}$, the relative velocity control is performed.

Here, $\theta_{steer}$ represents the steering angle, and $\theta_{steer.threshold}$ represents the steering angle limit value.

As described above, the various conditions for performing the relative velocity control in the accelerator pedal on mode, according to embodiments, have been provided. The controller (first controller) may perform the relative velocity control only when it is determined that some of or all the conditions for performing the relative velocity control are simultaneously satisfied.

Further, according to embodiments of the present disclosure, the control start relative distance $s_{on.start}$ may be calculated by using the minimum traveling distance $d_{rel.decel.min}$ of the vehicle and the target relative distance $s_{target}$.

Among the distances, the minimum traveling distance of the vehicle may be calculated as follows.

First, a drive line kinematic model from the motor to the wheel (driving wheel) may be expressed by the equations below.

[Equation 1]

$$\omega_w = \frac{i_f \eta_f}{\left(J_v + i_f^2 J_m\right)} T_m - \frac{1}{\left(J_v + i_f^2 J_m\right)} T_{dist} = a_1 T_m + a_2 T_{dist}$$

[Equation 2]

$$\dot{v}_{rel} = -\frac{r_w i_f \eta_f}{\left(J_v + i_f^2 J_m\right)} T_m + \frac{r_w}{\left(J_v + i_f^2 j_m\right)} T_{dist} = a_3 T_m + a_4 T_{dist}$$

Here, $i_f$, $\eta_f$, $J_v$, $J_m$, $T_m$, and $T_{dist}$ respectively represent a gear ratio from the motor to the wheel, a gear efficiency from the motor to the wheel, vehicle rotational inertia, motor rotational inertia, motor torque, and disturbance torque, and $a_1$, $a_2$, $a_3$, and $a_4$ respectively represent proportional factors set in consideration of parameters such as gear ratios and gear efficiency.

In addition, when the maximum deceleration torque of the motor, which is negative (−) torque, is $-T_{m.max}$ and the relative velocity and the road surface resistance torque at the time of the entry into the accelerator pedal on mode are respectively $v_{rel.on.in}$ and $T_{dist.on.in}$, the minimum traveling distance $d_{rel.decel.min}$ may be calculated based on Equation 3 below. The relative velocity related to the entry into the accelerator pedal on mode and the relative velocity related to the entry into the accelerator pedal off mode to be described below may be obtained from a radar sensor system.

$$\dot{v}_{rel} = -a_3 T_{m.max} + a_4 T_{dist.on.in}$$ [Equation 3]

$$v_{rel.future} = v_{rel.on.in} + [-a_3 T_{m.min} + a_4 T_{dist.on.in}] \, t = 0$$ [Equation 4]

$$t_f = -\frac{v_{rel.on.in}}{-a_3 T_{m.max} + a_4 T_{dist.on.in}}$$ [Equation 5]

$$d_{rel.decel.min} = \frac{1}{2} \frac{v_{rel.on.in}}{-a_3 T_{m.max} + a_4 T_{dist.on.in}} = a_5 v_{rel.on.in}^2$$ [Equation 6]

Here, $v_{rel.future}$ and $t_f$, $d_{rel.decel.min}$ respectively represent a future relative velocity, a time when the deceleration of the vehicle is ended, and a minimum traveling distance of the control target vehicle, and as represents a proportional factor calculated and set on the assumption that $T_{m.min}$ and $T_{dist.on.in}$ are fixed values. In the equations, an estimated value of the road surface resistance torque described below may be used as the road surface resistance torque $T_{dist.on.in}$.

As a result, the control start relative distance $s_{on.start}$ in the accelerator pedal on mode may be determined based on Equation 7 below by using the minimum traveling distance $d_{rel.decel.min}$ of the vehicle and the target relative distance $s_{target}$.

Further, with reference to Equation 6, it can be seen that the controller may obtain the minimum traveling distance only based on the relative velocity ($v_{rel.on.in}$ that may be obtained by the radar sensor system) when the vehicle enters the accelerator pedal on mode, and the minimum traveling distance may be used.

$$s_{on.start} = k_1 (d_{rel.decel.min} + s_{target})$$ [Equation 7]

Here, $k_1$ is a proportional factor set in consideration of the uncertainty of the minimum traveling distance.

Hereinafter, a method of determining the target relative velocity in the accelerator pedal on mode, according to an embodiment, is described.

The target relative velocity is determined by the target relative velocity determination part 23 of the first controller 20. The target relative velocity may be determined by an equation or map determined from the relative distance when the relative velocity control is performed in the accelerator pedal on mode.

The equation or map defines a correlation between the relative distance and the target relative velocity. The equation or map is inputted in advance to the target relative velocity determination part 23 of the first controller 20 and serves as setting information used to determine the target relative velocity.

The equations and map data that show correlations between the relative distances and the target relative velocities may vary depending on the ride quality of the vehicle. An example for determining the target relative velocity, according to an embodiment, is described below.

Assuming that the vehicle accelerates with uniform acceleration from an initial velocity of 0, the vehicle velocity ($v_{veh}=v$) and a vehicle displacement d may be expressed by the following equations.

$$v = at$$ [Equation 8]

$$d = \frac{1}{2} a t^2$$ [Equation 9]

$$t = \sqrt{2ad}$$ [Equation 10]

$$v = a\sqrt{2ad}$$ [Equation 11]

In Equations 8-11, v ($=v_{veh}$), a, d, and t respectively represent a vehicle velocity, a vehicle acceleration, a vehicle displacement (movement distance), and a time.

Examples of the equations capable of determining the target relative velocity based on the above-mentioned equations are as follows.

$$v_{rel.future} = \begin{cases} a_{rel.target}\sqrt{2a_{rel.target}(s - s_{target})} & (s < s_{target}) \\ 0 & (s \geq s_{target}) \end{cases}$$ [Equation 12]

Here, $v_{rel.target}$, $a_{rel.target}$, s, and $s_{target}$ respectively represent a target relative velocity relative to the preceding vehicle, a target relative acceleration, a relative distance, and a target relative distance, and the target relative acceleration corresponds to a tuning variable set in advance.

As another example of determining the target relative velocity, when the vehicle relative velocity at the time of starting the relative velocity control is $v_{rel.in}$, the target relative velocity may be limited by applying a lower limit value when the relative velocity $v_{rel.in}$ at the time of starting the relative velocity control is very low. This is because the vehicle cannot travel forward when the relative velocity $v_{rel.in}$ at the time of starting the relative velocity control is close to 0.

The target relative velocity may be determined based on Equation 13 below in consideration of the above-mentioned situation.

$$v_{rel.future} = \begin{cases} \dfrac{v_{rel.in}}{s_{on.start} - s_{target}}(s - s_{target}) & (s < s_{target}) \\ 0 & (s \geq s_{target}) \end{cases}$$ [Equation 13]

Next, the relative velocity control performed in the accelerator pedal on mode, according to an embodiment, is described.

First, during the process of controlling the relative velocity, the target motor torque may be determined by comparing the target relative velocity, determined as described above, with the actual relative velocity detected by the front detection part 12. The motor target torque may be determined by the relative velocity control part 24 of the first controller 20.

The target motor torque may include a feedforward control input and a feedback control input.

$$T_{mot.target} = F_{feedforward} + F_{feedback} \qquad \text{[Equation 14]}$$

Here, $T_{mot.target}$, $F_{feedforward}$, and $F_{feedback}$ respectively represent the target motor torque, the feedforward control input, and the feedback control input. As shown in Equation 14, the target motor torque may be calculated as a sum of the feedforward control input and the feedback control input.

Additionally, at the time of determining the target motor torque, a maximum value of the target motor torque may be limited, a minimum value of the target motor torque may be limited, or the amount of change in target motor torque may be limited. In this case, the target motor torque, calculated based on the assumption that the one-pedal driving is performed at ordinary times, may be used as a maximum limit value (upper limit value) for limiting the maximum value of the target motor torque and a minimum limit value (lower limit value) for limiting the minimum value of the target motor torque.

The target motor torque, set during the one-pedal driving at ordinary times, may be determined from an accelerator pedal input value detected by an accelerator pedal part of the driving information detection part 11. In this case, an equation or map capable of determining the target motor torque by inputting the accelerator pedal input value may be used.

The feedback control input in Equation 14 may be determined from errors of the target relative velocity and the actual relative velocity based on an equation such as Equation 15 below.

$$F_{feedback} = k_p e + k_i \int e \, dt + k_d \frac{de}{dt} \qquad \text{[Equation 15]}$$

Here, e represents a difference between two velocities, i.e., the errors of the target relative velocity and the actual relative velocity, and $k_p$, $k_i$, and $k_d$ respectively represent gains that are tuning variables. The gain values may each be a relative distance or a value that varies over time.

In Equation 14, the feedforward control input may be calculated by using a vehicle model and a vehicle relative velocity or a wheel velocity information of the vehicle. With reference to the above-mentioned vehicle drive line kinematic model, an estimator system for estimating the road surface resistance torque may be summarized as follows.

$$\dot{v}_{rel} = a_3 T_m + a_4 T_{dist} \qquad \text{[Equation 16]}$$

$$\dot{x} = Ax + Bu$$

$$y = Cx$$

-continued $$x = \begin{bmatrix} v_{rel} \\ T_{dist} \end{bmatrix}, \, y = v_{rel}, u = T_m, A = \begin{bmatrix} 0 & a_3 \\ 0 & 0 \end{bmatrix}, B = a_4, C = [1 \;\; 0]$$

The feedforward control input may be determined based on Equation 17 below by using Equation 16 above and the relative velocity information.

$$\dot{\hat{x}} = A\hat{x} + Bu + L_1(y - \hat{y}) \qquad \text{[Equation 17]}$$

$$\hat{y} = C\hat{x}$$

$$F_{feedforward} = \frac{1}{a_3}\left(\dot{v}_{rel.target} - a_4 \hat{T}_{dist}\right) = a_6 \dot{v}_{rel.target} + a_7 \hat{T}_{dist}$$

Here, ˆ represents an estimated value, $L_1$ represents a tuning variable, and $a_6$ and $a_7$ are proportional factors.

Further, the estimator system for estimating the road surface resistance torque may be additionally summarized as follows.

$$\dot{\omega}_w = a_1 T_m + a_2 T_{dist} \qquad \text{[Equation 18]}$$

$$\dot{x} = Ax + Bu$$

$$y = CX$$

$$x = \begin{bmatrix} \omega_w \\ T_{dist} \end{bmatrix}, \, y = \omega_w, u = T_m, A = \begin{bmatrix} 0 & a_1 \\ 0 & 0 \end{bmatrix}, B = a_2, C = [1 \;\; 0]$$

The feedforward control input may be determined based on Equation 19 below by using Equation 18 above and the wheel velocity information.

$$\dot{\hat{x}} = A\hat{x} + Bu + L_2(y - \hat{y}) \qquad \text{[Equation 19]}$$

$$\hat{y} = C\hat{x}$$

$$F_{feedforward} = \frac{1}{a_1}\left(\dot{v}_{rel.target} - a_2 \hat{T}_{dist}\right) = a_8 \dot{v}_{rel.target} + a_9 \hat{T}_{dist}$$

Here, $L_2$ represents a tuning variable, and as and ag are proportional factors.

As a result, with reference to Equations 17 and 19, it can be seen that the feedforward control input may be calculated by using estimated values of the target relative velocity and the road surface resistance torque.

When the target motor torque is determined as described above, the relative velocity control part 24 of the first controller 20 generates a target motor torque command, i.e., a command for generating the target motor torque as a final motor torque command and outputs the target motor torque command to the second controller 25. The second controller 25 controls the operation of the motor (e.g., the drive device 31) of the vehicle, in response to the motor torque command outputted from the relative velocity control part 24 of the first controller 20. Therefore, the motor may generate and output torque corresponding to the target motor torque.

2. Accelerator Pedal Off Mode

The controller (first controller) may be set to perform the vehicle relative velocity control in accordance with the vehicle relative distance(s) (the distance(s) from the preceding vehicle) and the target relative distance $s_{target}$ in the accelerator pedal off mode.

The relative velocity control may be performed after the vehicle is stopped for a moment in the accelerator pedal off mode. Alternatively, the relative velocity control may be performed immediately after the entry into the accelerator pedal off mode. The following control condition may be considered when the relative velocity control is performed after the vehicle is stopped for a moment.

Accordingly, when $d_{rel.coast.max} > s - s_{target}$, the relative velocity control is performed immediately after the entry into the accelerator pedal off mode. When $d_{rel.coast.max} \leq s - s_{target}$, the relative velocity control is performed after waiting for a situation in which the vehicle velocity $v_{veh}$ becomes equal to or lower than a preset vehicle velocity limit value $\Delta_1$ ($v_{veh} \leq \Delta_1$) in a state in which no motor torque is applied to the vehicle.

Here, $d_{rel.coast.max}$ represents a maximum traveling distance of the control target vehicle. The maximum traveling distance means a maximum movement distance that the vehicle travels while being naturally decelerated by the road surface resistance torque when no motor torque is applied to the vehicle.

The reason that the above-mentioned condition is considered is to consider the maximum traveling distance that is a kinematic distance that the vehicle travels while naturally decelerating when no motor torque is applied to the vehicle. Accordingly, the reason is that when the remaining relative distance ($s - s_{target}$) to the target relative distance $s_{target}$ is shorter than the maximum traveling distance, the vehicle may pass over the target relative distance when the relative distance control starts after waiting the stop of the vehicle.

In addition, the controller (first controller) may be set to perform the vehicle relative velocity control only when the vehicle velocity in the accelerator pedal off mode, i.e., the velocity of the control target vehicle (host vehicle) is equal to or lower than a predetermined control start relative velocity.

This may be summarized as follows.

When $v_{veh} > v_{veh.threshold}$, the relative velocity control is not performed.

When $v_{veh} \leq v_{veh.threshold}$, the relative velocity control is performed.

In addition, the controller (first controller) may be set to perform the vehicle relative velocity control only when the following predetermined condition is satisfied based on vehicle driving information and relative velocity information such as the wheel velocity and the vehicle velocity (the velocity of the host vehicle) in the accelerator pedal off mode.

When $|r_w \omega_w + v_{rel}| > v_{diff.threshold}$, the relative velocity control is not performed.

When $|w_w \omega_w + v_{rel}| \leq v_{diff.threshold}$, the relative velocity control is performed.

In addition, the controller (first controller) may be set to perform the vehicle relative velocity control only when the steering angle in the accelerator pedal off mode is equal to or smaller than a predetermined steering angle limit value.

This may be summarized as follows.

When $\theta_{steer} > \theta_{steer.threshold}$, the relative velocity control is not performed.

When $\theta_{steer} > \theta_{steer.threshold}$, the relative velocity control is performed.

As described above, the various conditions for performing the relative velocity control in the accelerator pedal off mode have been provided. The controller (first controller) may perform the relative velocity control only when it is determined that some of or all the conditions for performing the relative velocity control are simultaneously satisfied.

Next, a method of determining the maximum traveling distance is described below.

The maximum traveling distance may be determined based on the following equations by using the relative velocity $v_{rel.off.in}$ and the road surface resistance torque $T_{dist.off.in}$ when the vehicle enters the accelerator pedal off mode on the assumption that no motor torque is applied to the vehicle.

$$\dot{v}_{rel} = a_4 T_{dist.off.in} \qquad \text{[Equation 20]}$$

$$v_{rel} = v_{rel.off.in} + a_4 T_{dist.off.in} t \qquad \text{[Equation 21]}$$

$$t_f = -\frac{v_{rel.off.in}}{a_4 T_{dist.off.in}} \qquad \text{[Equation 22]}$$

$$d_{rel.coast.max} = \frac{1}{2} \frac{v_{rel.off.in}^2}{a_4 T_{dist.off.in}} = a_{10} v_{rel.off.in}^2 \qquad \text{[Equation 23]}$$

Here, $t_f$ represents a time when the deceleration of the vehicle is ended, and $a_{10}$ represents a proportional factor calculated and set on the assumption that the road surface resistance torque $T_{dist.off.in}$ is a fixed value. In the equations, an estimated value of the above-mentioned road surface resistance torque may be used as the road surface resistance torque $T_{dist.off.in}$.

Further, with reference to Equation 23, it can be seen that the controller may obtain the maximum traveling distance only based on the relative velocity $v_{rel.off.in}$ when the vehicle enters the accelerator pedal off mode, and the maximum traveling distance may be used.

In an embodiment, in the accelerator pedal off mode, the target relative velocity may be determined by a method identical to the determination method in the above-mentioned accelerator pedal on mode.

When the relative velocity control is performed after the vehicle is stopped, the target relative velocity may be determined by limiting the maximum value of the target relative velocity, and the target relative velocity may be obtained as a value limited by a preset relative velocity upper limit value.

Further, in an embodiment, the relative velocity control method in the accelerator pedal off mode is identical to the above-mentioned relative velocity control method in the accelerator pedal on mode without a difference. In order to prevent the repeated description, a separate description of the relative velocity control method in the accelerator pedal off mode has been omitted. As described above, even in the accelerator pedal off mode, the relative velocity control may be performed by the method identical to the method in the accelerator pedal on mode.

According to embodiments of the present disclosure, when the traffic situation on the road on which the vehicle travels corresponds to the congested section, the proximity distance control, i.e., the above-mentioned automatic distance control mode is performed. Hereinafter, a method of determining the congested section in the control system in FIG. 7, according to an embodiment, is described.

Figure 8:
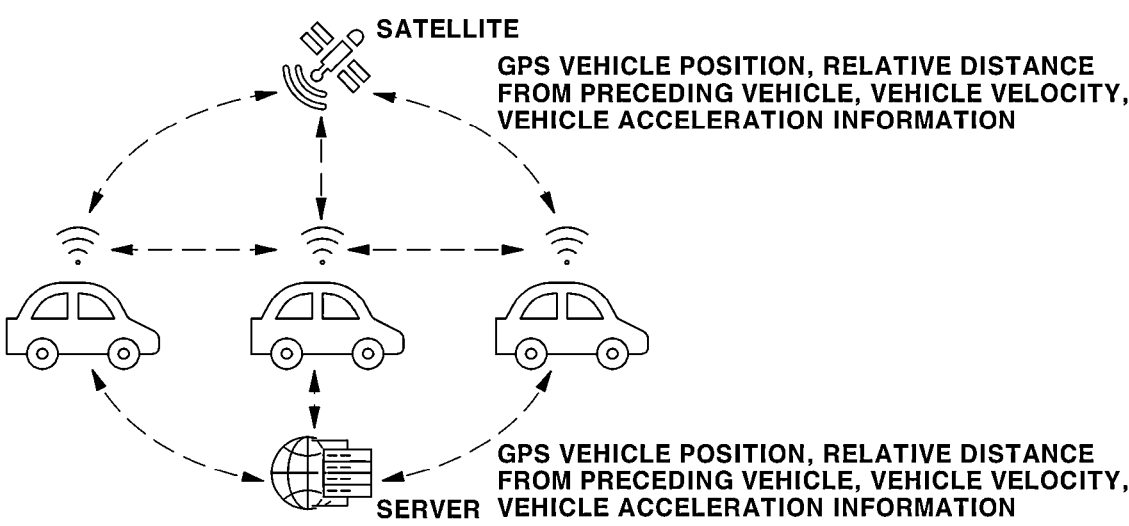
FIG. 8 is a view illustrating an information flow for determining a congested section, according to an embodiment of the present disclosure.

FIG. 8 is a view illustrating an information flow for determining a congested section, according to an embodiment of the present disclosure.

According to an embodiment of the present disclosure, a proximity distance control start condition may include a condition in which a road on which the host vehicle travels is in the congested section. In addition, the proximity distance control start condition may further include a condition in which the vehicle reaches a start position of the automatic control inspection section. The start position of the automatic control inspection section may be a position at which the relative distance between the host vehicle and the preceding vehicle is a preset maximum relative distance.

As illustrated in FIG. 8, the information used to determine the congested section includes information on the peripheral vehicles positioned in front of and behind the host vehicle on the traveling road. The information on the peripheral vehicles may be shared through the data server 1 or the artificial satellite 2. The information used to determine the congested section also includes information on the preceding vehicle with respect to the peripheral vehicle. The peripheral vehicles that share information through the data server 1 or the artificial satellite 2 may be peripheral vehicles connected by the connected car system.

In addition, the information on the peripheral vehicle may include an absolute position of the peripheral vehicle, a velocity of the peripheral vehicle, and an acceleration of the peripheral vehicle. The information on the preceding vehicle with respect to the peripheral vehicle may include a relative distance between the peripheral vehicle and the preceding vehicle positioned immediately in front of the peripheral vehicle, a velocity of the preceding vehicle with respect to the peripheral vehicle, and an acceleration of the preceding vehicle with respect to the peripheral vehicle.

The information may be shared through the data server 1 or the artificial satellite 2 and also shared through direct communication between the vehicles. Because a method of sharing information and data is a technology well known to those having ordinary skill in a vehicle connection technology and a connected car system technology, a detailed description thereof has been omitted from the present specification.

In addition, the relative distance between the connected vehicles may be calculated by using absolute positions of the vehicles (vehicle positions acquired from GPS signals). In the present specification, because the method of calculating the relative distance is a general well-known technology, a detailed description thereof has been omitted from the present specification.

In addition, the relative distance between each of the connected peripheral vehicles and the preceding vehicle positioned immediately in front of the peripheral vehicle, a velocity of the preceding vehicle with respect to each of the connected peripheral vehicles, and an acceleration of the preceding vehicle with respect to each of the connected peripheral vehicles may be measured by a radar sensor that is a front detection part of each of the connected peripheral vehicles.

Therefore, it can be seen that even when the preceding vehicle, that is positioned immediately in front of each of the connected peripheral vehicles, is not communicably connected to the host vehicle, the controller of the host vehicle may recognize the information excluding the absolute position of the preceding vehicle.

Among the components of the control system illustrated in FIG. 7, the distance control mode entry determination part 21 of the first controller determines whether to perform the proximity distance control by using the information received from the data server 1 or the artificial satellite 2, i.e., information on absolute positions of the communicably connected peripheral vehicles, vehicle velocities of the peripheral vehicles, accelerations of the peripheral vehicles, a relative distance between each of the peripheral vehicles and the preceding vehicle positioned immediately in front of the peripheral vehicle, a velocity of the preceding vehicle with respect to each of the peripheral vehicles, and an acceleration of the preceding vehicle with respect to each of the peripheral vehicles.

In this case, because the proximity distance control start condition during the one-pedal driving is satisfied when the traveling road is in the congested section, the distance control mode entry determination part 21 determines to start and perform the proximity distance control and transfer the determination result to the target motor torque determination part 22 and the target relative velocity determination part 23.

When the determination result of the distance control mode entry determination part 21 indicates that the proximity distance control is not started and performed, the target motor torque determination part 22 generates the target motor torque during the one-pedal driving at ordinary times based on the accelerator pedal input value in accordance with the determination result instead of the target motor torque when the vehicle enters the automatic distance control mode (proximity distance control mode) and the automatic distance control mode (proximity distance control mode) is performed.

The target motor torque determination part 22 determines the target motor torque, that meets the driver request torque, based on the accelerator pedal input value (APS value) acquired by the accelerator pedal detection part (APS) of the driving information detection part 11 during the one-pedal driving in the non-entry state of the automatic distance control mode. The target motor torque determination part 22 generates the motor torque command for generating the determined target motor torque.

Further, when the determination result of the distance control mode entry determination part 21 indicates the entry into the automatic distance control mode, i.e., that the proximity distance control during the one-pedal driving according to the present disclosure is started and performed, the target motor torque determination part 22 determines the target motor torque, that meets the driver request torque, based on the accelerator pedal input value in a similar manner. In an embodiment, this process is identical to that when the vehicle does not enter the automatic distance control mode.

However, the target relative velocity determination part 23 determines the target relative velocity relative to the preceding vehicle by using information on the relative distance from the preceding vehicle in the preceding vehicle information detected by the front detection part 12 during the one-pedal driving in the entry state of the automatic distance control mode.

In addition, the relative velocity control part 24 determines the target motor torque for controlling the vehicle relative velocity (the relative velocity from the preceding vehicle) in the automatic distance control mode to the target relative velocity by using an actual relative velocity from the preceding vehicle in the preceding vehicle information detected by the front detection part 12 and using the target relative velocity from the preceding vehicle determined and inputted by the target relative velocity determination part 23. The relative velocity control part 24 generates the motor torque command for generating the determined target motor torque.

Therefore, the motor torque command in the non-entry state of the automatic distance control mode, that is outputted by the target motor torque determination part 22 of the first controller 20, and the motor torque command in the entry state of the automatic distance control mode, that is outputted by the relative velocity control part 24 of the first controller 20, are inputted to the second controller 25.

Therefore, the second controller 25 controls the operation of the motor (e.g., the drive device 31) in response to the motor torque command in the non-entry state of the automatic distance control mode, that is inputted by the first controller 20, or the motor torque command in the entry state of the automatic distance control mode.

The process of determining the congested section, according to an embodiment, is described below. It is assumed that the information that is shared to determine the congested section, i.e., the information on the peripheral vehicles positioned in front of and behind the host vehicle on the traveling road, the information being shared through the data server 1 or the artificial satellite 2 and the information on the preceding vehicle with respect to the peripheral vehicle are information known by the controller of the control target vehicle, i.e., the distance control mode entry determination part 21 of the first controller 20.

According to an embodiment of the present disclosure, in order to determine the congested section, the distance control mode entry determination part 21 of the first controller 20 estimates the number of peripheral vehicles positioned within a preset distance (that may be a relative distance limit value to be described below) from the host vehicle. In this case, the number of peripheral vehicles means all the vehicles positioned within the preset distance set in front of and behind the host vehicle on the traveling road.

Among the peripheral vehicles within the preset distance, there may be vehicles that are not in communication with one another because the connected car system technology (the vehicle connection technology) is not applied. Therefore, it is important to estimate the number of peripheral vehicles that are not in communication with one another but are positioned between the peripheral vehicles communicably connected by the connected car system.

Figure 9:
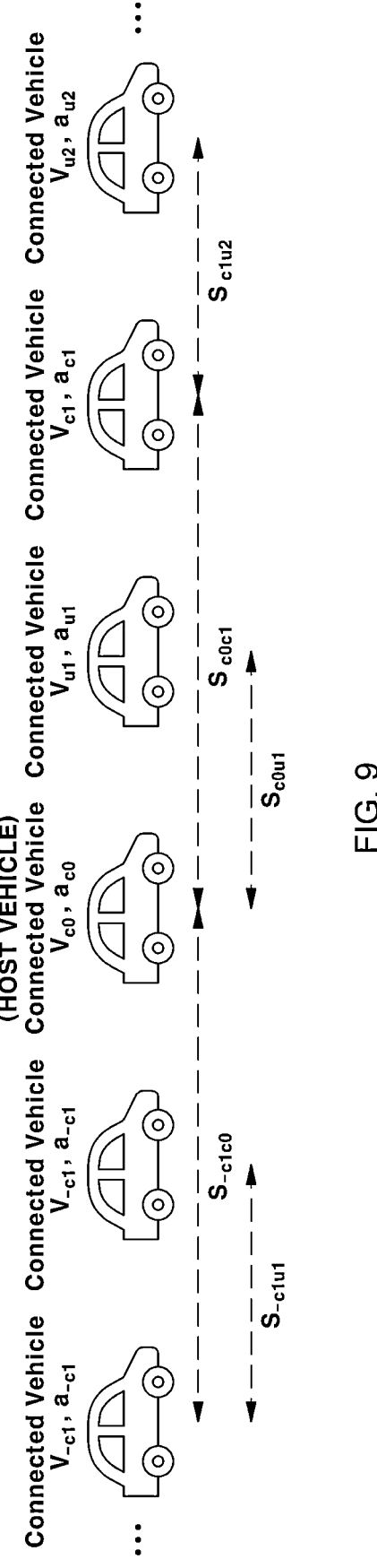
FIG. 9 is a view for explaining a method of estimating the number of vehicles existing within a preset distance from a host vehicle, according to an embodiment of the present disclosure.

FIG. 9 is a view for explaining a method of determining the congested section according to an embodiment of the present disclosure. More particularly, FIG. 9 is a view for explaining a method of estimating the number of vehicles existing within a preset distance from the host vehicle, according to an embodiment of the present disclosure.

In order to estimate the number of vehicles that are not connected as described above, the property in which the following vehicle tries to keep up with the preceding vehicle at a similar velocity and the property in which the following vehicle tries to keep up with the preceding vehicle with a time delay are used.

In this case, in order to estimate the number of non-connected vehicles, information on a connected vehicle (hereinafter, referred to as a 'preceding connected vehicle') positioned in front of the non-connected vehicle and a connected vehicle (hereinafter, referred to as a 'following connected vehicle') positioned behind the non-connected vehicle is used.

For example, it is assumed that the non-connected vehicle is present between the preceding connected vehicle and the following connected vehicle. In order to estimate the number of non-connected vehicles positioned between the preceding connected vehicle and the following connected vehicle, the velocity of the preceding connected vehicle with respect to the time and the velocity of the following connected vehicle with respect to the time may be compared, the velocity of the preceding connected vehicle may be gradually decreased, and the amount of time delay when a velocity error between the preceding connected vehicle and the following connected vehicle is equal to or smaller than a predetermined value for a predetermined time and the velocity error is minimized may be estimated. Thereafter, it is possible to estimate the number of vehicles that are not connected by the connected car system but are positioned between the preceding connected vehicle and the following connected vehicle, by using the estimated amount of time delay.

In this case, the amount of time delay may be calculated by solving an optimization problem by using a root mean square (RMS) error, as shown in the following examples.

$$n_{delay} = \operatorname{argmin} \sum_{i=1}^{N} \sqrt{\{x(i - n_{delay}) - y(i)\}^2} \qquad \text{[Equation 24]}$$

$$t_{delay} = n_{delay} \times T_{sampling} \qquad \text{[Equation 25]}$$

Here, x, y, $n_{delay}$, $t_{delay}$, $T_{sampling}$, and N respectively represent a velocity of the preceding connected vehicle, a velocity of the following connected vehicle, the discrete amount of time delay, the amount of time delay, a sampling period, and a window size used to compare the velocities.

In addition, the time of the window size used to compare the velocities, i.e., a velocity error calculation section ($T_{window}$) may be calculated based on the following equation.

$$T_{window} = N \times T_{sampling} \qquad \text{[Equation 26]}$$

The above-mentioned error is not limited to the RMS error but may include a commonly used error. For example, the errors may include an absolute value error, errors with different orders, and the like.

When the velocity error between the preceding connected vehicle and the following connected vehicle is equal to or smaller than a predetermined error, it is determined that the traveling road is not in the congested section because there is no delay time. In this case, the situation in which it is determined that the congested section does not exist means that the control is performed in accordance with the proximity distance control start condition used for the method in the related art without using a method of determining the congested section.

Figure 10:
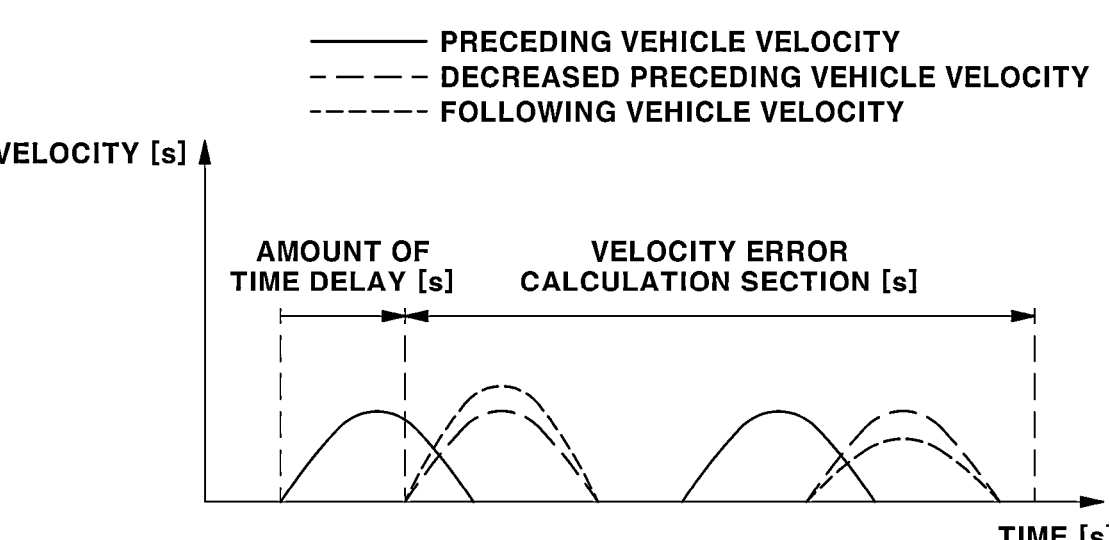
FIG. 10 is an exemplified view for explaining a method of estimating the amount of time delay, according to an embodiment of the present disclosure.

FIG. 10 is a view for explaining an example method of estimating the amount of time delay, according to an embodiment of the present disclosure. In FIG. 10, the term 'preceding vehicle velocity' means a velocity of the preceding connected vehicle, the term 'decreased preceding vehicle velocity' means a decreased velocity of the preceding connected vehicle, and the term 'following vehicle velocity' means a velocity of the following connected vehicle.

As illustrated, the amount of time delay may be determined from the velocity of the preceding connected vehicle with respect to the time and the velocity of the following connected vehicle with respect to the time. The amount of time delay may be obtained based on a time interval between two time points at which the velocity of the preceding connected vehicle and the velocity of the following connected vehicle are equal to each other while the velocity of the preceding connected vehicle and the velocity of the following connected vehicle are changed.

For example, the amount of time delay may be obtained based on a time interval between a velocity increase start time point at which the velocity of the preceding connected vehicle begins to increase and a velocity increase start time point at which the velocity of the following connected vehicle begins to increase.

In addition, when the amount of time delay is obtained, the number of vehicles that are not connected but are positioned between the connected vehicles may be determined as the number proportional to the amount of time delay, as described below.

When $\delta_1$<Amount of time delay≤$\delta_2$, the number of non-connected vehicles is 1.

When $\delta_2$<Amount of time delay≤$\delta_3$, the number of non-connected vehicles is 2.

When $\delta_3$<Amount of time delay≤$\delta_4$, the number of non-connected vehicles is 3.

When $\delta_{k-2}$<Amount of time delay≤$\delta_{k-1}$, the number of non-connected vehicles is n−1.

When $\delta_{k-1}$<Amount of time delay≤$\delta_k$, the number of non-connected vehicles is n.

Here, $\delta_1$, $\delta_2$, $\delta_3$, . . . , $\delta_{k-2}$, $\delta_{k-1}$, and $\delta_k$ may respectively represent changeable tuning variables, and the tuning variables may be inputted and stored, as predetermined values, into the controller and used to determine the number of non-connected vehicles.

When the number of vehicles that are not connected by the connected car system but are positioned between the preceding connected vehicle and the following connected vehicle is determined as described above, a total number of vehicles may be determined by summing up the number of preceding connected vehicles, the number of following connected vehicles, and the number of non-connected vehicles. Further, whether the current host vehicle is positioned in the congested section may be determined by using the determined total number of vehicles. In this case, it may be determined that the current host vehicle is positioned in the congested section when the total number of vehicles is equal to or larger than a predetermined number of vehicles.

Further, congested section determination conditions that may be additionally considered among the proximity distance control start conditions may include the following conditions.

First, as described below, it may be determined that the host vehicle is in the congested section when the number of vehicles, which is related to a relative distance limit value determined based on the host vehicle, is smaller than a preset vehicle number limit value.

$$\frac{\text{Number of vehicles}}{S_{threshold}} < \text{Congested section when } \alpha_{threshold}$$

Here, $S_{threshold}$ represents the relative distance limit value, and $\alpha_{threshold}$ represents the vehicle number limit value. In addition, in Equation 28, the number of vehicles is the number of vehicles positioned within the relative distance limit value.

In Equation 28, the number of vehicles may be one of i) the number of peripheral vehicles that are positioned within the relative distance limit value and positioned in front of the host vehicle and ii) the number of peripheral vehicles positioned within the relative distance limit value and positioned behind the host vehicle.

For example, the number of vehicles may be set to the larger number of the number of peripheral vehicles positioned in front of the host vehicle and the number of peripheral vehicles positioned behind the host vehicle. The number of peripheral vehicles may be determined by summing up the number of communicably connected vehicles and the number of non-connected vehicles.

According to Equation 28, whether the current traveling road is in the congested section is determined based on the number of vehicles existing within a particular relative distance based on the ego vehicle (host vehicle).

The relative distance limit value may be determined as a relative distance between the ego vehicle (host vehicle) and one peripheral vehicle selected by the controller from the connected peripheral vehicles (the peripheral vehicles connected by the connected car system). In this case, for example, the peripheral vehicle that is positioned to be farthest from the host vehicle among the connected peripheral vehicles within a separately preset distance from the host vehicle may be selected by the controller.

In addition, it may be determined that the congested section exists when an average of velocities of at least two peripheral vehicles, among the preceding peripheral vehicles or the following peripheral vehicles except for the host vehicle, is equal to or lower than a preset velocity limit value.

In addition, it may be determined that the congested section exists when an average of accelerations of at least two peripheral vehicles, among the preceding peripheral vehicles or the following peripheral vehicles except for the host vehicle, is equal to or lower than a preset acceleration limit value.

In this case, the vehicles that are included in the calculation of the average velocity and the average acceleration are not relevant to whether the vehicles are connected by the connected car system. The velocity and acceleration of the non-connected vehicle may be information shared after being measured by the radar sensor of the connected vehicle positioned immediately behind the non-connected vehicle.

Although embodiments of the present disclosure have been described in detail hereinabove, the scope of the present disclosure is not limited thereto. Many variations and modifications made by those having ordinary skill in the art using the basic concept of the present disclosure, which is defined in the following claims, are also included in the scope of the present disclosure.

The disclosure has been described in detail with reference to example embodiments thereof. However, it should be appreciated by those having ordinary skill in the art that changes may be made in these embodiments without departing from the principles and spirit of the present disclosure, the scope of which is defined in the appended claims and their equivalents.

What is claimed is:

1. A vehicle control method for one-pedal driving assistance, the vehicle control method comprising:

collecting, by a controller in a host vehicle having a one-pedal driving system, i) information on peripheral vehicles positioned, on a traveling road, in front of and behind the host vehicle and connected by a connected car system and ii) preceding vehicle information including information on a preceding vehicle positioned in front of each of the peripheral vehicles;

determining, by the controller, whether the host vehicle is positioned in a congested section based on the information on the peripheral vehicles and the information on the preceding vehicle with respect to each of the peripheral vehicles, wherein determining whether the host vehicle is positioned in the congested section includes determining a number of vehicles positioned within a relative distance limit value from the host vehicle based on at least one of the information on the peripheral vehicles or the information on the preceding vehicle corresponding to each of the peripheral vehicles, and determining that the host vehicle is positioned in the congested section when a value determined by dividing the number of vehicles by the relative distance limit value is smaller than a preset vehicle number limit value; and controlling, by the controller, a relative velocity relative to the preceding vehicle by controlling an operation of a drive device configured to drive the host vehicle so that i) a proximity distance control mode starts when a condition in which the host vehicle is positioned in the congested section is satisfied and ii) a relative distance between the host vehicle and the preceding vehicle is controlled to a preset target relative distance based on real-time driving information on the host vehicle and the preceding vehicle information.

2. The vehicle control method of claim 1, wherein the information on the peripheral vehicles and the information on the preceding vehicle with respect to each of the peripheral vehicles comprise one of i) information shared with the host vehicle through an artificial satellite or a data server or ii) information shared through direct communication between the host vehicle and the peripheral vehicles.

3. The vehicle control method of claim 1, wherein:
the information on the peripheral vehicles includes information on absolute positions of the peripheral vehicles, velocities of the peripheral vehicles, and accelerations of the peripheral vehicles, and
the information on the preceding vehicle with respect to each of the peripheral vehicles includes information on a relative distance between each of the peripheral vehicles and the preceding vehicle positioned immediately in front of the peripheral vehicle, a velocity of the preceding vehicle positioned immediately in front of each of the peripheral vehicles, and an acceleration of the preceding vehicle positioned immediately in front of each of the peripheral vehicles.

4. The vehicle control method of claim 3, wherein the information on the preceding vehicle with respect to each of the peripheral vehicles comprises information acquired by a front detection part mounted in each of the peripheral vehicles.

5. The vehicle control method of claim 3, wherein determining whether the host vehicle is positioned in the congested section includes:
determining a number of vehicles positioned within a relative distance limit value from the host vehicle based on the information on the peripheral vehicles and the information on the preceding vehicle with respect to each of the peripheral vehicles, and
determining that the host vehicle is positioned in the congested section when a value determined by dividing the number of vehicles by the relative distance limit value is smaller than a preset vehicle number limit value.

6. The vehicle control method of claim 1, wherein the number of vehicles is one of i) the number of peripheral vehicles that are positioned within the relative distance limit value and positioned in front of the host vehicle and ii) the number of peripheral vehicles positioned within the relative distance limit value and positioned behind the host vehicle.

7. The vehicle control method of claim 6, wherein the peripheral vehicles positioned in front of the host vehicle and the peripheral vehicles positioned behind the host vehicle include peripheral vehicles connected by the connected car system and peripheral vehicles that are not connected by the connected car system.

8. The vehicle control method of claim 7, wherein the controller determines the relative distance limit value as a relative distance between the host vehicle and one peripheral vehicle selected from the peripheral vehicles connected by the connected car system.

9. The vehicle control method of claim 1, wherein determining whether the host vehicle is positioned in the congested section includes determining that the host vehicle is positioned in the congested section when a condition in which an average of velocities of at least two peripheral vehicles, among the peripheral vehicles positioned in front of the host vehicle or the peripheral vehicles positioned behind the host vehicle, is equal to or lower than a preset velocity limit value is further satisfied.

10. The vehicle control method of claim 1, wherein determining whether the host vehicle is positioned in the congested section includes determining that the host vehicle is positioned in the congested section when a condition in which an average of accelerations of at least two peripheral vehicles, among the peripheral vehicles positioned in front of the host vehicle or the peripheral vehicles positioned behind the host vehicle, is equal to or lower than a preset acceleration limit value is further satisfied.

11. A vehicle control method for one-pedal driving assistance, the vehicle control method comprising:
collecting, by a controller in a host vehicle having a one-pedal driving system, i) information on peripheral vehicles positioned, on a traveling road, in front of and behind the host vehicle and connected by a connected car system and ii) preceding vehicle information including information on a preceding vehicle positioned in front of each of the peripheral vehicles;
determining, by the controller, whether the host vehicle is positioned in a congested section based on the information on the peripheral vehicles and the information on the preceding vehicle with respect to each of the peripheral vehicles; and
controlling, by the controller, a relative velocity relative to the preceding vehicle by controlling an operation of a drive device configured to drive the host vehicle so that i) a proximity distance control mode starts when a condition in which the host vehicle is positioned in the congested section is satisfied and ii) a relative distance between the host vehicle and the preceding vehicle is controlled to a preset target relative distance based on real-time driving information on the host vehicle and the preceding vehicle information,
wherein:
the information on the peripheral vehicles and the information on the preceding vehicle with respect to each of the peripheral vehicles include velocities of the peripheral vehicles and a velocity of the preceding vehicle with respect to each of the peripheral vehicles, and
determining whether the host vehicle is positioned in the congested section includes:
estimating an amount of time delay from a velocity of a preceding connected vehicle, among the peripheral vehicles connected by the connected car system, positioned in front of the host vehicle and a velocity of a following connected vehicle positioned behind the preceding connected vehicle,
estimating a number of vehicles that are not connected by the connected car system but are positioned between the preceding connected vehicle and the following connected vehicle by using the estimated amount of time delay, and determining whether the host vehicle is positioned in the congested section based on a total number of vehicles determined by summing up the number of preceding connected vehicles, the number of following connected vehicles, and the number of vehicles that are not connected by the connected car system.

12. The vehicle control method of claim 11, wherein estimating the amount of time delay from the velocity of the preceding connected vehicle and the velocity of the following connected vehicle includes obtaining the amount of time delay based on a time interval between two time points at which the velocity of the preceding connected vehicle and the velocity of the following connected vehicle are equal to each other while the velocity of the preceding connected vehicle and the velocity of the following connected vehicle are changed.

13. The vehicle control method of claim 11, wherein estimating of the amount of time delay from the velocity of the preceding connected vehicle and the velocity of the following connected vehicle includes estimating the amount of time delay when a velocity error is equal to or smaller than a predetermined value and the velocity error is minimized, wherein the velocity error is a difference between the velocity of the preceding connected vehicle and the velocity of the following connected vehicle.

14. The vehicle control method of claim 11, wherein estimating the number of vehicles that are not connected by the connected car system includes determining the number of non-connected vehicles as a number proportional to the amount of time delay.

15. A vehicle control method for one-pedal driving assistance, the vehicle control method comprising:

collecting, by a controller in a host vehicle having a one-pedal driving system, i) information on peripheral vehicles positioned, on a traveling road, in front of and behind the host vehicle and connected by a connected car system and ii) preceding vehicle information including information on a preceding vehicle positioned in front of each of the peripheral vehicles;

determining, by the controller, whether the host vehicle is positioned in a congested section based on the information on the peripheral vehicles and the information on the preceding vehicle with respect to each of the peripheral vehicles;

acquiring, by the controller, driving information of the host vehicle detected through a driving information detection part and preceding vehicle information detected through a front detection part;

determining, by the controller, whether the host vehicle enters an automatic control inspection section by using information on a relative distance between the host vehicle and the preceding vehicle in the acquired preceding vehicle information; and controlling, by the controller, a relative velocity relative to the preceding vehicle by controlling an operation of a drive device configured to drive the host vehicle so that i) a proximity distance control mode starts when a condition in which the host vehicle is positioned in the congested section is satisfied and ii) a relative distance between the host vehicle and the preceding vehicle is controlled to a preset target relative distance based on real-time driving information on the host vehicle and the preceding vehicle information, wherein the controller starts the proximity distance control mode when a condition in which the host vehicle enters the automatic control inspection section is further satisfied.

16. The vehicle control method of claim 15, wherein the controller determines the automatic control inspection section as a section from a position at which a distance from the preceding vehicle is a maximum relative distance set by a driver through an input device to the preceding vehicle.

17. The vehicle control method of claim 15, wherein a target relative distance from the preceding vehicle is set in the controller by a driver through an input device.

18. The vehicle control method of claim 15, wherein controlling the relative velocity relative to the preceding vehicle includes:

determining target motor torque for controlling the relative velocity relative to the preceding vehicle, generating a motor torque command for generating the determined target motor torque, and controlling an operation of a motor in response to the generated motor torque command, wherein the motor is a drive device.

19. The vehicle control method of claim 15, wherein the controller is set to perform relative velocity control when a condition in which a vehicle velocity of real-time driving information is equal to or lower than a predetermined control start relative velocity in an automatic distance control mode is satisfied.

* * * * *